US011206514B2

(12) United States Patent
Elia et al.

(10) Patent No.: US 11,206,514 B2
(45) Date of Patent: Dec. 21, 2021

(54) SYSTEM AND METHOD FOR MANAGING DISTRIBUTION OF INFORMATION IN MULTI-ANTENNA AND MULTI-TRANSMITTER ENVIRONMENTS

(71) Applicants: Petros Elia, Juan les Pins (FR); Eleftherios Lampiris, Biot (FR)

(72) Inventors: Petros Elia, Juan les Pins (FR); Eleftherios Lampiris, Biot (FR)

(73) Assignee: EURECOM G.I.E, Biot-Sophia Antipolis (FR)

( * ) Notice: Subject to any disclaimer, the term of this patent is extended or adjusted under 35 U.S.C. 154(b) by 45 days.

(21) Appl. No.: 16/642,407

(22) PCT Filed: Aug. 30, 2018

(86) PCT No.: PCT/EP2018/073350
§ 371 (c)(1),
(2) Date: Feb. 27, 2020

(87) PCT Pub. No.: WO2019/043098
PCT Pub. Date: Mar. 7, 2019

(65) Prior Publication Data
US 2020/0228935 A1    Jul. 16, 2020

(30) Foreign Application Priority Data
Aug. 31, 2017   (EP) .................................. 17290111

(51) Int. Cl.
*H04W 4/08*     (2009.01)
*H04B 7/0417*   (2017.01)
(Continued)

(52) U.S. Cl.
CPC ............ *H04W 4/08* (2013.01); *H04B 7/0417* (2013.01); *H04B 7/0456* (2013.01); *H04L 67/06* (2013.01); *H04L 67/2847* (2013.01)

(58) Field of Classification Search
CPC ........ H04W 4/08; H04W 4/06; H04B 7/0417; H04B 7/0456; H04B 7/0413; H04B 7/024;
(Continued)

(56) References Cited

U.S. PATENT DOCUMENTS

| | | | |
|---|---|---|---|
| 2014/0207913 A1* | 7/2014 | Maddah-Ali | H04L 67/06 709/219 |
| 2017/0070593 A1* | 3/2017 | Cooper | H04L 67/1063 |
| 2019/0044580 A1* | 2/2019 | Zhou | H04B 7/0456 |

OTHER PUBLICATIONS

International Search Report and Written Opinion in corresponding International Patent Application No. PCT/EP2018/073350 dated Mar. 7, 2019. 20 pages.
(Continued)

*Primary Examiner* — Afshawn M Towfighi
(74) *Attorney, Agent, or Firm* — Leason Ellis LLP

(57) ABSTRACT

There is disclosed a process for communication between a wireless base station with L transmit antennas and a set of receiving nodes equipped with caches so that content from a set of files can be stored in these caches. By formulating a novel way of setting users in groups and storing content partially as function of this grouping, it is achieved to increase gains in terms of number of users served simultaneously compared to the state-of-art. The approach taken here makes use of the multiple transmit antennas to boost the number of multicasting users by up to L times compared to the state-of-art, thus reducing significantly the transmission time. The invention is also presented for i) wired communications, ii) multi-transmitter cooperative communications in both wireless or wired networks and iii) in a device-to-device setting where users desire to exchange files between one another.

15 Claims, 18 Drawing Sheets

(51) Int. Cl.
*H04B 7/0456* (2017.01)
*H04L 29/08* (2006.01)

(58) Field of Classification Search
CPC . H04L 67/06; H04L 67/2847; H04L 67/2857; H04L 67/2842
See application file for complete search history.

(56) References Cited

OTHER PUBLICATIONS

International Preliminary Report on Patentability in corresponding International Patent Application No. PCT/EP2018/073350 dated Mar. 3, 2020. 16 pages.

Shariatpanahi et al. "Multi-antenna coded caching." 2017 IEEE International Symposium on Information Theory (ISIT). IEEE, 2017. 8 pages.

Destounis et al. "Alpha fair coded caching." 2017 15th International Symposium on Modeling and Optimization in Mobile, Ad Hoc, and Wireless Networks (WiOpt). IEEE, 2017. 12 pages.

Maddah-Ali et al. "Fundamental limits of caching." IEEE Transactions on Information Theory 60.5 (2014) 2856-2867. 12 pages.

\* cited by examiner

SYSTEM AND METHOD FOR MANAGING DISTRIBUTION OF INFORMATION IN MULTI-ANTENNA AND MULTI-TRANSMITTER ENVIRONMENTS

CROSS-REFERENCE TO RELATED PATENT APPLICATIONS

This application is a U.S. National Stage Application under 35 U.S.C. § 371 of International Patent Application No. PCT/EP2018/073350, filed Aug. 30, 2018, which claims the benefit of priority of European Patent Application number 17290111.8 filed Aug. 31, 2017, both of which are incorporated by reference in their entireties. The International Application was published on Mar. 7, 2019, as International Publication No. WO 2019/043098 A1.

TECHNICAL FIELD

The present invention relates to the field of digital communications and specifically to a system and a method for managing distribution of information in multi-antenna and multi-transmitter environments.

BACKGROUND ART

Nowadays, extensive research is performed in order to improve the speed and reduce the delay of delivery of files, such as video and audio files. In wireless communications, for instance, a well-known method for improving communication between a base station (B) and different receiving nodes $N_1, N_2, \ldots, N_K$, is the use of multiple antennas at the transmitting base station which essentially employ channel information in order to beamform signals to different users, thus generally allowing each user to receive only their own messages. This ability to send vectors of signals (each signal departing from one of the transmit antennas) at a time, results in the so called 'multiplexing gain', which refers to the ability to serve multiple users at a time. Saying that a multi-antenna (MIMO) precoding system offers multiplexing gain $G_M$ generally implies that the system can serve—over a single time-frequency slot—$G_M$ users at a time. In practice though, the difficulty of obtaining proper channel state information, severely limits the stand-alone effectiveness of such multi-antenna precoding techniques, see reference L. Zheng and D. N. C. Tse, "Communication on the Grassmann manifold: A geometric approach to the noncoherent multiple-antenna channel," IEEE Trans. Information Theory, February 2002.[1] below.

In wireless, as well as wired communications, another well-known method used to reduce delay in communication between a transmitter and different receiving users, is referred to as 'cache-aided multicasting', as discussed in reference [2] below, and it involves the use of storage (also referred to as 'caches') in the users' devices.

Caches have historically been used to pre-store typically popular content, such as for example, popular movies. FIG. 1 illustrates such a known architecture based on a base-station 11 (B) that communicates with nodes 14 through multiple antennas 12 in particular, and more general to nodes $N_1, N_2, \ldots, N_K$, in a wireless communication system, where nodes $N_1, N_2, \ldots, N_K$, have storage capabilities, as illustrated by cache 15 in FIG. 1. This recent approach of cache-aided multicasting works by carefully filling up each receiver cache with content that is possibly undesired to that user but which is expected to be desired by different users, such that when this undesired content is transmitted, the user can use its cache to remove this undesired interference. Receiver-side caches are used in such a way so that the transmitter can simultaneously serve different files to different users with a composite signal which carries a combination of what each receiver has requested, and which is multicasted to all receivers simultaneously, such that each receiver uses their own cache in order to remove unwanted files from the composite signal, and thus retrieve their own signal of interest. This approach—in theory—is shown to provide substantial speed-up gains, referred to as 'cache-aided multicasting gains'. Saying that multicasting system offers cache-aided multicasting gain $G_C$ generally implies that the system can serve—over a single time-frequency slot—$G_C$ users at a time more than if it had no caches. It was believed that in theory, such cache-aided multicasting systems gains would be very large, inducing a delay that was theoretically calculated to be small, regardless of the number of users requesting files.

Nevertheless, soon came the realization that these gains are severely limited by the fact that each file would have to be segmented into an exponentially large number of subfiles 13 (in FIG. 1), which severely limits the gains [3], which means that it severely reduces the number of users that can be served at a time, and thus substantially increases communication delay compared to the theoretical result.

Combining Multi-Antenna Precoding with Cache-Aided Multicasting.

Given the aforementioned limitations of both multi-antenna precoding and cache-aided multicasting methods, some authors analyzed the possible combination of these two approaches. In theory, this was shown to be possible: combining an L-antenna precoder (which gives multiplexing gain of $G_M=L$) with a cache-aided multicasting method which gives a multicasting gain $G_C$, it was shown (see [4],[5] below) that one could achieve a theoretical total gain $G_T=L+G_C$. This was interesting because it the two methods are seemingly orthogonal: precoding is based on signal separation where each user is expected to get a different signal, while multicasting is based on signal mixing where each the users get a common composite signal.

However, the author rapidly identified a main, drastic problem of combining multi-antenna precoding with cache-aided multicasting. To date though, all existing algorithms for combining these two ingredients (MIMO and cache-aided coded multicasting) suffer from an exponentially aggravated astronomical complexity, referred to as subpacketization or segmentation complexity. This is now a well-known limitation and it has been documented clearly in references [2][4][5] below, and it has been studied extensively in [3] that highlights the severe reductions in the 'compromised' cache-aided multicasting gain $\overline{G}_C \ll G_C$ which—under a variety of real-life limitations on the file size, and on the packet size—is unfortunately not expected to be substantial.

Specifically in a system a system like our system here, with an L-antenna base station serving K receiving nodes, for this theoretical gain $G_T=L+G_C$ to be achieved, each file would have to be segmented into $$\binom{K}{G_C} \times \binom{K-G_C-1}{L-1}$$

different parts.

One will rapidly observe that, with illustrative values such as: K=1000 users; Gc=10 and L=5 for instance, the formulation above leads to an astronomic figure of $10^{33}$, thus ruining any hopes of a realistic, pragmatic solution.

Indeed, given that the smallest possible part is the bit, the above expression reveals that each file would need to be of astronomical size for the gains to appear This clearly shows that it is practically infeasible to meaningfully combine multi-antenna precoding methods with cache-aided multicasting methods, because of this aforementioned astronomical segmentation complexity identified in the existing state-of-art algorithms.

As a result, it has been widely accepted, in the literature, that merging multi-antenna precoding with cache-aided multicasting cannot be implemented in practice because of this astronomical complexity which allows only for minimal gains associated to caching, resulting in unrealistically large communication delays when delivering files of realistic sizes.

The present invention aims to contradict such theorical limitation and provides a technically feasible and realistic solution to such problem of combining cache aided multicasting in a MIMO environment.

The following Bibliographical references are of interest to this technical problem.
[1] L. Zheng and D. N. C. Tse, "Communication on the Grassmann manifold: A geometric approach to the non-coherent multiple-antenna channel," IEEE Trans. Information Theory, February 2002.
[2] M. Maddah-Ali and U. Niesen, "Fundamental limits of caching," IEEE Trans. Information Theory, May 2014.
[3] K. Shanmugam, M. Ji, A. M. Tulino, J. Llorca, and A. G. Dimakis, "Finite length analysis of caching-aided coded multicasting," ArXiv e-prints, August 2015.
[4] S. P. Shariatpanahi, A. S. Motahari, and B. H. Khalaj, "Multi-server coded caching," ArXiv e-prints, August 2015.
[5] N. Naderializadeh, M. A. Maddah-Ali, and A. S. Avestimehr, "Fundamental limits of cache-aided interference management," CoRR, vol. abs/1602.04207, 2016. [Online]. Available: http://arxiv.org/abs/1602.04207

SUMMARY OF THE INVENTION

It is an object of this invention to combine MIMO and cache-aided multicasting in a way that allows for substantial multicasting gains, with a system that is still technically feasible.

It is another object of this invention to introduce a method of using multiple transmit antennas to reduce the complexity associated with caching and cache-aided multicasting algorithms.

It is still another object of this invention to introduce a method of using multiple transmit antennas to deliver files of limited sizes, with reduced transmission delay.

It is a further object of this invention to combine caching at the receivers and many antennas at the transmitter, to increase the goodput of modern telecommunication systems.

It is still another object of this invention to use caching at the receivers to reduce implementation and hardware complexity of multi-antenna systems.

It is another object of this invention to introduce a method that extends single antenna caching algorithms to be applied in systems with at least two antennas.

It is another object of this invention to introduce a method of using multiple transmit antennas to deliver files, where said method achieves reduced file subpacketization.

It is another object of this invention to introduce a method of using multiple transmit antennas to deliver files, where said method allows increased packet sizes.

It is another object of this invention to reduce the complexity associated with decentralized caching and decentralized cache-aided multicasting algorithms.

It is another object of this invention to increase the gains from using decentralized caching and decentralized cache-aided multicasting algorithms to deliver files of limited size.

It is another object of this invention to apply multiple transmitters rather than just multiple antennas, to achieved the above said objects of this invention.

It is another object of this invention to apply multiple transmitters or relays to achieved the above said objects of this invention in the presence of a wired network.

The above, and other objects of this invention are achieved by means of a process that applies to a multi-antenna broadcast and multicast system, where a multi-antenna transmitting base station (B) transmits to receivers $N_1, N_2, \ldots, N_K$ which are equipped with caches. In this system, the process involves the step of:
 grouping K users into groups containing a specified number of users per group, and
 involving a first phase or time slot during which the base station employs two or more antennas to transmit information that is received and then partially cached at some or all of the caches of the receivers, the method being a function of at least the grouping of the users.
 involves a second time slot during which some or all receiving nodes proceed to request additional information, and based on this as well as on additional channel state information that the receivers feedback to the transmitter;
 generating by the base station (B), on the basis of the user grouping, a multi-antenna transmit signal with the purpose of transmitting the requested data files to said receiving nodes;
 decoding by said participating receiving nodes the signal transmitted by said base station (B), using the information received in said first and second time slots and the information in the caches, so as to allow each receiving node $N_k$ to compute an estimation of each requested file $F_{r_k}$.

This system combines multi-antenna precoding with cache-aided multicasting, to reduce the complexity associated with cache-aided multicasting algorithms, thus allowing for a new method of using multiple transmit antennas that delivers files of limited sizes, with much reduced transmission delay.

The invented caching process is based on the idea that grouping defines, to a certain extent, the caching content, whereby the caching algorithm guarantees that some users store content that is highly related, while other users store content in such a way that there exists a certain degree of partial overlap.

Delivery of content is done by selecting some of the user groups at a time, and creating a vector comprised of some of the desired content of each user in these selected groups. Specifically, by selecting some groups for content delivery, the transmitted vector becomes the combination (for example, the linear combination) of the precoded data vector for each group.

Decoding at the receiver side is done by using the cached content along with the channel state information of all receivers participating in communication at that particular instance, meaning that only the receivers in the selected groups need to provide the channel state information.

In decentralized caching algorithms the delivery phase is done in a greedy manner, usually through graph coloring or some other methods. The here proposed method allows for an exponential decrease of the search space, because instead of having a graph where each graph node is a user, we have a graph where each graph node is a group.

The invention carries out different processes, and particularly:

A process of communication between a transmitting base station, BS, with L>1 transmit antennas, and a set of K user terminals $N_1, N_2, \ldots, N_K$, UTs, in a wireless communication system, wherein UTs have storage capabilities, caches, and where said UTs will ask for a file from a library of files and wherein said process involves the steps at the BS of:

i) A first time-slot during which:
Each UT is assigned to one group from a plurality of groups (grouping).
A set of files of interest $F_1, F_2, \ldots, F_N$ is identified, that may be requested by the UTs (library of files);
Files belonging to the library of files are segmented (subfiles) and each subfile is labeled, wherein the aforementioned labelling can take various forms such as indicating the groups that each subfile will be cached by;
The BS transmits subfiles from some or all files of the library and each UT stores (caches)or not caches each subfile according to the group the UT belongs to;

ii) A second time-slot during which:
Two or more UTs (requesting UTs) request one or more files from the files of the library;
The BS picks $$\frac{G}{L} + 1$$

groups (picked groups) and activates up to L requesting UTs per group (active UTs);
The BS receives channel state information (CSIT) from all active UTs, which CSI could take various forms well known to a skilled man, such as training symbols and precoder selection;
The BS communicates to the UTs CSI knowledge about the channels of other UTs (active CSIR), which active CSIR could take various forms well known to a skilled man, such as training symbols and precoder selection;
Using the CSIT the BS createsprecoder matrix $H_{G_i}^{-1}$ corresponding to each picked group $G_i$, that is designed to reduce or nullify interference between active UTs of group $G_i$. The aforementioned precoder matrix can be created using any from a plurality of methods, such as Zero-Forcing, MMSE precoding and precoder selection;
For each picked group $G_i$, the BS selectssubfiles from the files requested by the group's active UTs (active files), such that each subfile is cached at all other picked groups apart from the UT's group and the BS arranges those subfiles in a vector (active group vector);
The BS multiplies each active group's vector with the group's matrix precoder $H_{G_i}^{-1}$ forming the group i precoder-vector product;
The BS combines all group precoder-vector products ina single vector using some operation such as addition and linear combination forming the message;
The BS transmits the message.

And the steps at the UT of:
) A first time-slot during which:
The UT is assigned to a group;
The UT stores segments of files to its cache according to the group the UT belongs to;
ii) A second time-slot during which:
The UT communicates to the BS the UT's file preference;
The UT is informed of the other UTs that request files from the same BS (participating UTs) and the participating UTs' file preferences;
The UT communicates to the BS the UT's channel state information (CSI), which CSI can take various forms such as training symbols orprecoder selection;
The UT receives from the BS channel state information knowledge concerning, at least, the other active UTs (active CSIR).
The UT receives a message and proceeds to decode said message by employing the UT's cached subfiles and the active CSIR.

In one embodiment, the user terminals may not have storage capabilities. More specifically, the transmission from the base station considers available receiver-state information, receiver location information and/or network connectivity information.

The invention also provides a process of communication between a set of L>1 wired servers (WSs) and a set of K wired user terminals $N_1, N_2, \ldots, N_K$ (WUTs), wherein WUTs $N_1, N_2, \ldots, N_K$ have storage capabilities (caches), where said WUTs will ask for a file from a library of known files and where there are intermediary nodes (NN) performing arithmetic operations on received messages and forwarding them and wherein said process involves the steps at the WS of:

i) A first time-slot during which:
Each WUT is assigned to one group from a plurality of groups;
A set of files of interest $F_1, F_2, \ldots, F_N$ is identified, that may be requested by the WUTs (library of files);
Files belonging in the library are segmented into subfiles and are labeled. The aforementioned labelling can take various forms such as indicating the groups that each subfile will be cached by;
The WSs transmit subfiles from some or all files of the library and each WUT stores (caches) or not caches each subfile according to the group the WUT belongs to;

ii) A second time-slot during which:
Two or more WUTs request one or more files from the files of the library (requesting WUTs);
The WSs pick $$\frac{G}{L} + 1$$

groups (picked groups) and activate up to Lrequesting WUTs per group (active WUTs);
The WS receives network coding state information (NCSI) from all active WUTs and/or NNs, which NCSI describes the arithmetic operations taking place at the NNs and which NCSI could take various forms such as training symbols and precoder selection;
The WSs transmit network coding state information messages to WUTs (NCSIR) which network coding state information corresponds to processes happening between the WSs and active WUTs and which communication can take various forms such as transmission of training symbols and precoder association;

Using the aforementioned NCSI the WSs create the precoder matrix $H_{G_i}^{-1}$ corresponding to each picked group $G_i$, which precoder matrix $H_{G_i}^{-1}$ is designed such that to reduce or nullify interference between active WUTs of that group; wherein the aforementioned precoder matrix $H_{G_i}^{-1}$ can be created using various ways such as by performing an inversion of the network coding information matrix between WSs and WUTs;

For each picked group $G_i$, the WSs select subfiles from the files requested by the group's active WUTs (active files), such that each subfile is cached at all other picked groups apart from the WUT's group and the WSs arrange those subfiles in a vector (active group vector);

The WSs multiply each active group's vector with the group's matrix precoder $H_{G_i}^{-1}$ forming group i precoder-vector product;

The WSs combine all group precoder-vector products using some operation such as addition and linear combination forming the message;

Each WS transmits one element from the message;

The steps at a NN of:

Receiving a set of messages from different WSs;

Combining received messages using pre-defined operations such as additions and multiplications;

Transmitting combined messages;

And the steps at the WUT of:

i) A first time-slot during which
  The WUT is assigned to a group;
  The WUT stores segments of files to its cache according to the group the WUT belongs to;

ii) A second time-slot during which:
  The WUT communicates to the WSs the WUT's file preference;
  The WUT is informed of the other WUTs that will be part of the transmission (active WUTs);
  The WUT is informed of the active WUTs' file preferences;
  The WUT communicates to the WS the WUT's network coding state information (NCSI), which NCSI can take various forms such as training symbols precoder selection;
  The WUT receives from the WSsNCSI concerning the active WUTs (active NCSIR);
  The WUT receives a message and proceeds to decode said message by employing the WUT's cached content and active NCSIR;

In one embodiment, some of the wired user terminals may not have storage capabilities. More specifically, the transmission from the wired server considers available receiver-state information, receiver location information and/or network connectivity information.

Preferably, the wired server or one or more intermediary nodes are connected directly to at least two wired user terminals.

The invention furthermore achieves a process of communication between a set of K wireless user terminals $N_1$, $N_2, \ldots, N_K$ (D2DUTs), wherein D2DUTs $N_1, N_2, \ldots, N_K$ have storage capabilities (caches), where said D2DUTs will ask for a file from a library of known files and wherein said process involves the steps of:

i) A first time-slot during which:
  Each D2DUT is assigned to one group from a plurality of groups;
  A set of files of interest $F_1, F_2, \ldots, F_N$ is identified, that may be requested by the D2DUTs (library of files);
  Files belonging to the library are segmented (subfiles) and are labeled, wherein the aforementioned labelling can take various forms such as indicating the groups that each subfile will be cached by;
  Subfiles are transmitted from a base station or some other device and each D2DUT stores (caches) or not caches each subfile according to the group the D2DUT belongs to;

ii) A second time-slot during which:
  Two or more D2DUTs request one or more files from the files of the library(requesting D2DUTs);
  Using coordination or some pre-defined selection criterion a set of $$\frac{G}{L} + 1$$

groups are picked (picked groups) and are activated up to L>1 requesting D2DUTs per group (active D2DUTs);

One group comprised of up to LD2DUTs is assigned to act as the transmitting groups. The transmitting groups' active D2DUTs are the transmitting D2DUTs; wherein the rest $$\frac{G}{L}$$

groups compose the receiving groups and the active users of the receiving groups compose the receiving D2DUTs;

Channel state information (CSI) from all active D2DUTs is being exchanged between them, which CSI could take various forms such as training symbols and precoder selection;

Using the aforementioned CSI the transmitting D2DUTs create the precoder matrix $H_{G_i}^{-1}$ for each receiving group $G_1$, such that reduces or nullifies interference between receiving D2DUTs of that group; wherein the aforementioned precoder matrix can be created using any from a plurality of methods, such as Zero-Forcing, MMSE precoding and precoder selection;

For each receiving group $G_i$, thetransmitting D2DUTs select subfiles from the files requested by the receiving D2DUTs (active files), such that each subfile is cached by the transmitting group and all receiving groups apart from group $G_i$, and the transmitting group places those subfiles in a vector (receiving group vector);

The transmitting D2DUTs multiply each receiving group's vector with the group's matrix precoder $H_{G_i}^{-1}$ forming receiving group i precoder-vector product;

The transmitting D2DUTs combine all group precoder-vector products using some operation such as addition and linear combination (vector message);

Each transmitting D2DUTtransmitsone element from the vector message;

And the steps at the receiving D2DUTs of:

i) A first time-slot during which the UT stores segments of files to its cache.

ii) A second time-slot during which:
  The D2DUT communicates to the rest D2DUT's the D2DUT's file preference;
  The D2DUT is informed of the other participating D2DUTs (requesting UTs);
  The D2DUT is informed of the other participating D2DUTs' file preference (requested files);

The D2DUT communicates to the requesting D2DUTs the D2DUT's channel state information (CSI), which CSI can take various forms such as training symbols and precoder selection;

The D2DUT receives from other D2DUTs channel state information (active CSIR);

The D2DUT receives a message and proceeds to decode said message by employing the D2DUT's cache and the active CSIR.

In one embodiment, some of the wireless user terminals are not equipped with caches. Preferably, the transmission from the wireless user terminals considers available receiver-state information, receiver location information and/or network connectivity information.

At last, the invention carries out a process of communication between a set of L>1 wireless distributed base stations (dBSs) and a set of K wireless user terminals $N_1, N_2, \ldots, N_K$ (UTs), wherein UTs $N_1, N_2, \ldots, N_K$ have storage capabilities (caches), where said UTs will ask for a file from a library of known files and wherein said process involves the steps at the dBSs of:

i) A first time-slot during which:
Each UT is assigned to one group from a plurality of groups;
A set of files of interest $F_1, F_2, \ldots, F_N$ is identified, that may be requested by the UTs (library of files);
Files belonging in the library are segmented (subfiles) and are labeled, wherein the aforementioned labelling can take various forms such as indicating the groups that each subfile will be cached by;
The dBSs transmit subfiles from some or all files of the library and each UT stores (caches) or not caches each subfile according to the group the UT belongs to;

ii) A second time-slot during which:
Two or more UTs request one or more files from the files of the library(requesting UTs);
The dBSs pick $$\frac{G}{L} + 1$$

groups (picked groups) and activate up to L requesting UTs per group (active UTs);
The dBSs receive channel state information (CSIT) from all active UTs, which CSIT could take various forms such as training symbols and precoder selection;
The dBSs communicate channel state information knowledge about the channels of other active UTs (active CSIR), which active CSIR could take various forms well known to a skilled man, such as training symbols and precoder selection;
Using the aforementioned CSIT the dBSs create the precoder matrix $H_{G_i}^{-1}$ for each picked group $G_i$, which precoder matrix $H_{G_i}^{-1}$ is designed such that to reduce or nullify interference between active UTs of that group; wherein the aforementioned precoder matrix can be created using various ways such as precoder selection, Zero-Forcing and MMSE precoding;
For each picked group $G_i$, the dBSs select subfiles from the files requested by the active UTs (active files), such that each subfile is cached at all picked groups apart from group $G_i$ and the dBSs place those subfiles in a vector (active group vector);

The dBSs multiply each active group's vector with the group's matrix precoder $H_{G_i}^{-1}$ forming group i precoder-vector product;
The dBSs combine all group precoder-vector products in the form of some operation such as addition and linear combination(message);
Each dBS transmits one element from the message;

And the steps at the UT of:
i) A first time-slot during which the UT stores segments (subfiles) of files to its cache,
ii) A second time-slot during which:
The UT communicates to the dBSs the UT's file preference;
The UT is informed of the otherUTs that will be part of the transmission (requesting UTs);
The UT is informed of requesting UTs' file preferences;
The UT communicates to the dBSs the UT's channel state information (CSI), which CSI can take various forms such as training symbols and precoder selection;
The UT receives from the dBSs CSI concerning the active UTs (active CSIR);
The UT receives a message and proceeds to decode said message by employing the UT's cache and active CSIR.

In one embodiment, some of the user terminals may not have storage capabilities. Furthermore, in one specific embodiment, the transmission from the distributed base stations considers available receiver-state information, receiver location information and/or network connectivity information.

Preferably, the distributed base stations are equipped with one or more transmit antennas and wherein active users per group can be chosen to be at most equal to the total number of transmitting antennas that are found at the distributed base stations.

DESCRIPTION OF THE PREFERRED EMBODIMENTS

Figure 1:
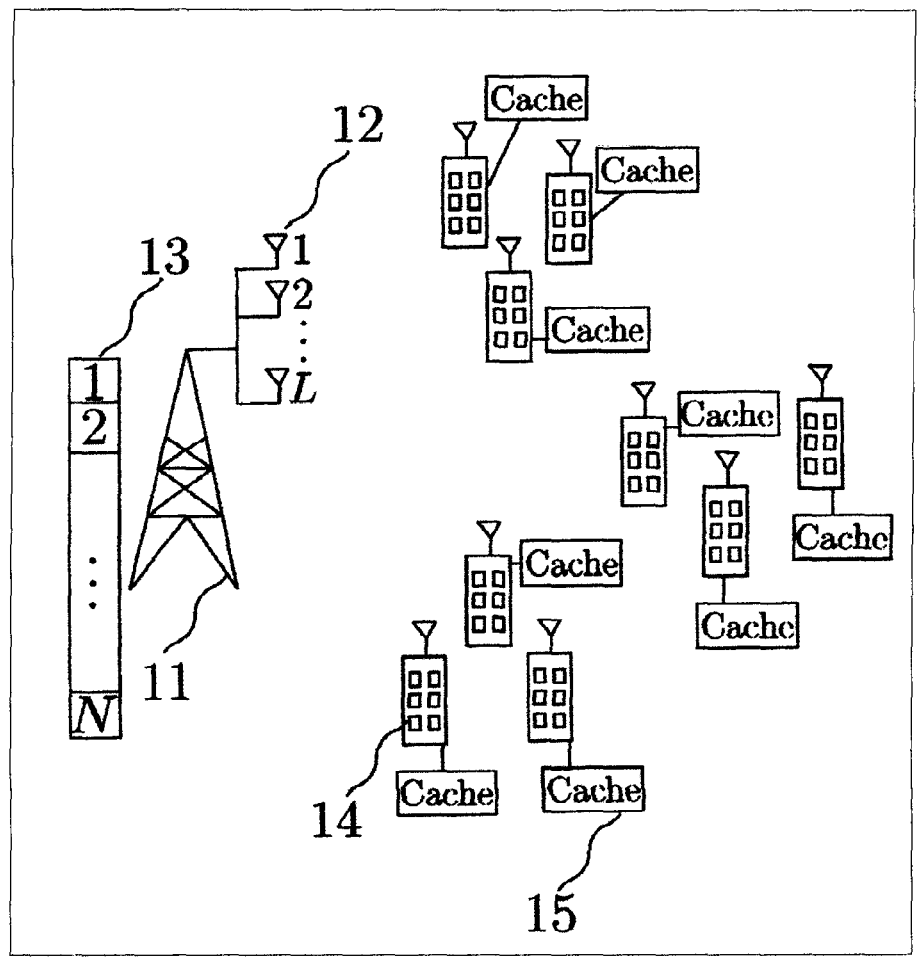
FIG. 1 illustrates an architecture with a base station B (11), comprised of L antennas (12) and having access to a library of N files (13), serving K users (14), each with cache (15) of size equal to the size of M files.

There will now be described in details how one can improve content distribution in wireless and wired networks. The invention will be more particularly described in relation with a multi-antenna configuration and/or with multi-transmitter systems, either wireless or wired. With the purpose to distribute digital content to receiving nodes which have storage memory and can cache part of this content and where there exists some interference as a result of the existence of many such receiving nodes with conflicting requested data.

While the current state-of-art methods exploit receiver side caches to achieve cache-aided multicasting (i.e., exploit the use of caches to allow for transmitting a signals that are useful to many users at a time), such current state-of-art methods achieve multicasting gains that are severely limited, because of the well-known limitation that such gains require that each file be segmented into an exponentially large number of sub-files. Thus, given that the smallest segment can be that of a bit, the delivery of files with real-life size constraints, incurs much limited multicasting gains, and thus large delays. In the current state of art, this limitation exists (and is in fact made worse) when such state-of-art cache-aided multicasting methods are combined with multi-antenna precoding methods. Currently it is practically infeasible to meaningfully combine multi-antenna precoding methods with cache-aided multicasting methods, because of this aforementioned astronomical segmentation complexity brought about by existing state-of-art algorithms.

This limitation is tackled here by the design of new methods and apparatus which dramatically increases the state-of-art multicasting gains, by dramatically decreasing the aforementioned segmentation complexity and by dramatically decreasing the file size that is needed for high gains to appear.

In order to achieve such feasible solution, the inventors had to reconsider the formulation of the technical problem to solve. In summary, in the context of combining "MIMO" with "cache aided multicasting", it appears a huge problem which prohibits the design of any feasible solution. Indeed the key obstacle in the combination of MIMO and cache-aided multicasting is the entailed need to divide the files composing the library to be transmitted to the users into a myriad of small parts or packets. The technical problem to be solved is how to combine MIMO and cache-aided multicasting in a way that allows for substantial multicasting gains, with a system that is still technically feasible.

By reconsidering such technical problem, the inventors had carried out a new approach, a new solution for achieving an exponential reduction in segmentation complexity of invented algorithm.

The current invention in this patent application here, manages—for the same exact problem of an L-antenna base station serving K cache aided users—to reduce this complexity to a very manageable $$\binom{\frac{K}{L}}{\frac{G_C}{L}}$$

or even lower, closer to $$\left(\frac{1}{\gamma}\right)^{\frac{K\gamma}{L}-1}.$$

A good way to see the benefits of the current invention, is with an example.

Example: Consider a base station that has L=20 antennas, delivering files from a library of N=1000 different movies to K=1000 different wireless users, each having a storage cache of size being the equivalent to the size of M=20 movies (i.e., each user can store 2% of the library). In this setting the best known multiplexing gain is $G_M$=L=20 and the best known (theoretical) multicasting gain is $$G_C = \frac{KM}{N} = 20,$$

thus the total gain (in theory) is $G_T$=20+20=40. The state of art algorithms for combining multi-antenna precoding with cache-aided multicasting, in order to serve the theoretical 40 users at a time, required segmentation complexity that was approximately $$\binom{1000}{20} \times \binom{979}{19}$$

which is approximately equal to $10^{68}$ (approaching the number of atoms in the universe). The invented algorithm in this patent application requires complexity approximately 100 (one hundred). Thus even if we were allowed to segment a file into a million parts, this would allow for almost no cache-aided multicasting gains $G_C$, whereas the invented method here can achieve the theoretical gain of 20 (adding an extra 20 users at a time per time-frequency slot), with a very reasonable segmentation complexity of merely 100.

Technical solution: Key features that allow for the increased gains.

These gains are achieved mainly as a result of three innovative aspects that are key in our invention:

a) A novel caching (cache-placement) method which—unlike in any other cache-aided coded multicasting algorithms—regulates the amount of overlap between the contents of the caches, to be a variable that changes from cache to cache. This has not been done before, and it is a key ingredient in the success of the algorithm.

b) The introduction of the concept of user-grouping, which allows—in some instances of the problem—to set the caches of each group to be identical. This reduces the complexity of the problem without reducing the performance gains.

c) A novel transmission scheme that provides a total gain $G_T=L\times G'_C$ that is a multiplicative (rather than additive) combination of the multiplexing gain with the multicasting gain.

More particularly, there is provided a process that applies to a multi-antenna broadcast and multicast system, where a multi-antenna transmitting base station (B) transmits to receivers $N_1, N_2, \ldots, N_K$ which are equipped with caches. In this system, the process involves the steps of:

- grouping K users into groups containing a specified number of users per group,
- involving a first phase or time slot during which the base station employs two or more antennas to transmit information that is received and then partially cached at some or all of the caches of the receivers. The method of storing this information (i.e., the method of caching) is a function of at least the grouping of the users.
- involving a second phase or time slot during which some or all receiving nodes proceed to request additional information, e.g. the play of one particular movie, and based on this as well as on additional channel state information that the receivers feedback to the transmitter.
- generating by the base station (B) of a multi-antenna transmit signal, typically in the form of a vector (or a matrix) whose length is equal to the number of transmit antennas, based on the users' grouping, with the purpose of transmitting the requested data files to said receiving nodes
- decoding by each participating node on the basis of the use of the information received in said first and second time slots and the information in the caches, so as to allow each receiving node $N_k$ to compute an estimation of each requested file $F_{r_k}$.

A key aspect of the caching process above is based on the grouping of users which defines, to a certain extent, the caching content, whereby the caching algorithm guarantees that some users store content that is highly related, while other users store content in such a way that there exists a certain degree of partial overlap. The performance gains are in part because intra-group caches have very high redundancy (for example, caches of the same group can have all elements in common), while inter-group caches have reduced redundancy (in the sense that only a few files repeat in different caches). Having some users (members of the same group) have very similar or identical caches, manages to reduce the dimensionality of the multicasting problem, thus reducing complexity, while maintaining the overall gain.

This system combines multi-antenna precoding with cache-aided multicasting, to reduce the complexity associated with cache-aided multicasting algorithms[1], thus allowing for a new method of using multiple transmit antennas that delivers files of limited sizes, with much reduced transmission delay.

It can be seen that the caches are processed on the basis of the groups of users, and this, to a certain extent, the caching content, whereby the caching algorithm guarantees that some users store content that is highly related, while other users store content in such a way that there exists a certain degree of partial overlap.

In accordance with the invention described, the delivery of content is done by selecting some of the user groups at a time, and creating a vector comprised of some of the desired content of each user in these selected groups. Specifically, by selecting some groups for content delivery, the transmitted vector becomes the combination (for example, the linear combination) of the precoded data vector for each group.

For example, if in the absence of algorithm invented, a group of users (group 1) could be served their desired data by a vector that is a result of multi-antenna precoding, and then during another time slot another group of users (group 2) could be served similarly by another vector that results from a precoder, then the invented algorithm employs caching (cache-aided coded multicasting) techniques so that the two vectors are sent simultaneously (one 'on top' of the other) thus serving both groups simultaneously.

Decoding at the receiver side is done by using the cached content along with the channel state information of all receivers participating in communication at that particular instance, meaning that only the receivers in the selected groups need to provide channel state information.

In decentralized caching algorithms the delivery phase is done in a greedy manner, usually through graph coloring or some other methods. The here proposed method allows for an exponential decrease of the search space, because instead of having a graph where each graph node is a user, we have a graph where each graph node is a group.

One thus see that, by introducing here a new apparatus and method which precede the cache-placement and file delivery phases, we can improve the performance: from that of a system that achieves a compromised cache-aided multicasting gain $\overline{G}_C \ll G_C$, into the performance of a system that achieves in many cases of real-life interest, the entire (theoretical) multicasting gain $G_C \approx L\times \overline{G}_C$, thus boosting the previously compromised multicasting gains by a factor of approximately L. This is the first time that multi-antenna methods are used to boost the real-life cache-aided multicasting gains. This boost is highlighted in the following example.

Example

Consider a system with K users with caches, that achieves a real-life (compromised) multicasting gain of $\overline{G}_C=6$. In a setting of a base station with L=5 antennas, applying our method would boost this to an achieved multicasting gain of $L\times\overline{G}_C=30$ (treating a total of $L+L\times\overline{G}_C=35$ users at a time). Such gains have not been experienced before, to the best of our knowledge.

Note on the timeliness of the invention:

The above exploitation of multiple-antenna systems is consistent with today's trends, where more than one antenna in a single transmitter is becoming common even in domestic WiFi routers, while mobile vendors are moving toward large antenna arrays. Similarly, proposed solutions for 5G and beyond—which are focused on accommodating increased data traffic—aim to have tens or even hundreds of antennas. As a result, deploying the here proposed method is practical, and even with the use of a modest number of antennas, it can prove highly beneficial to decreasing the delays of content distribution. This invention also comes at a time when both, single-antenna caching and massive-antenna arrays without caching—when implemented independently—fail to scale so as to meet the current and future demands for content distribution, mostly due to their fundamental limitations. The herein proposed method combines these two in a complementary way which achieves to significantly slow-down their inevitable saturation in the regime of many users.

In order to illustrate the wide possibilities of application of the invention, there will now be described, in detail, a first embodiment covering a wireless configuration (I), a second embodiment directed to a wired network (II), a third embodiment describing a D2D (device to device) setting (III) and a fourth embodiment describing a wireless setting with distributed antennas.

I. First Embodiment (Wireless)

There will now be described a preferred first embodiment which shows the invented role given to the multi-antenna base station (B) and to the receiving nodes. The new approach combines multi-antenna precoding with cache-aided multicasting and manages to reduce the complexity associated with cache-aided multicasting algorithms, and to allow for much reduced transmission delay when delivering files of any given sizes.

The preferred embodiment, FIG. 1, corresponding to a base station B 11, comprised of L antennas 12, and having access to a library of N files 13, serving K users 14, each fitted with a cache 15 storage of size equal to the size of M files.

Figure 3:
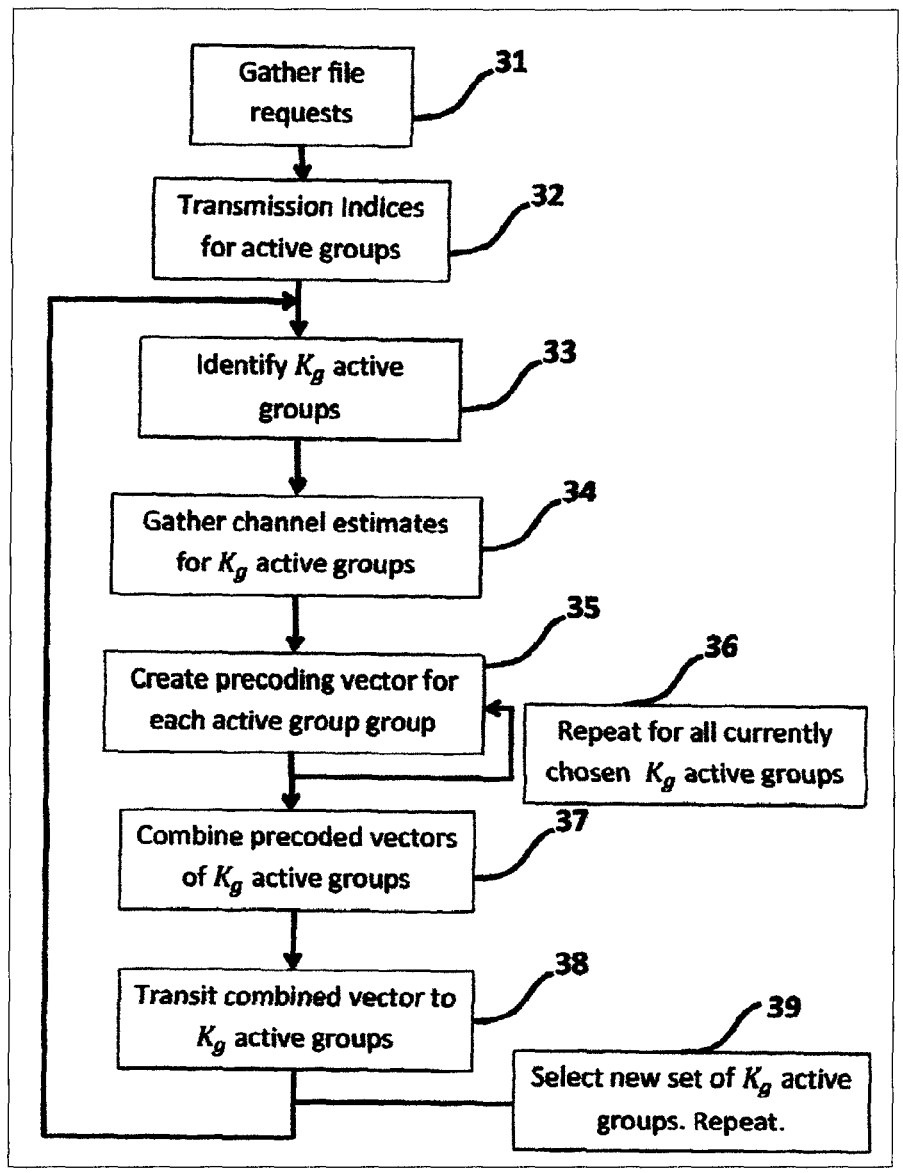
FIG. 3 illustrates one embodiment of a process of transmission of requested data. Delivery is done for $K_g$ user groups at a time.
Figure 4:
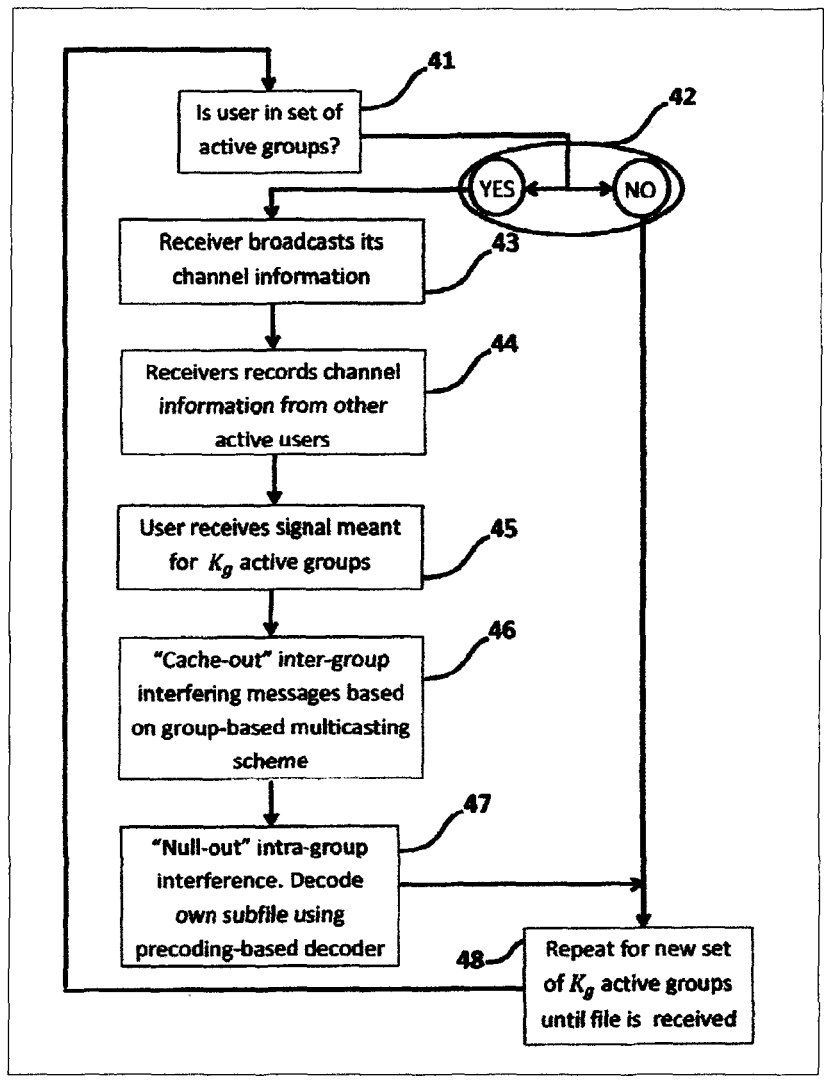
FIG. 4. illustrates a process of decoding requested subfile at receiving node.

In this first embodiment, there are three basic processes embodying the two time slots mentioned above: the process, of the first time slot, that leads to content placement in the caches of the receiving nodes (FIG. 2), the process of the second time slot that leads to transmission of content by the base station B (FIG. 3), and the process of decoding at the receiving nodes (FIG. 4).

Figure 2:
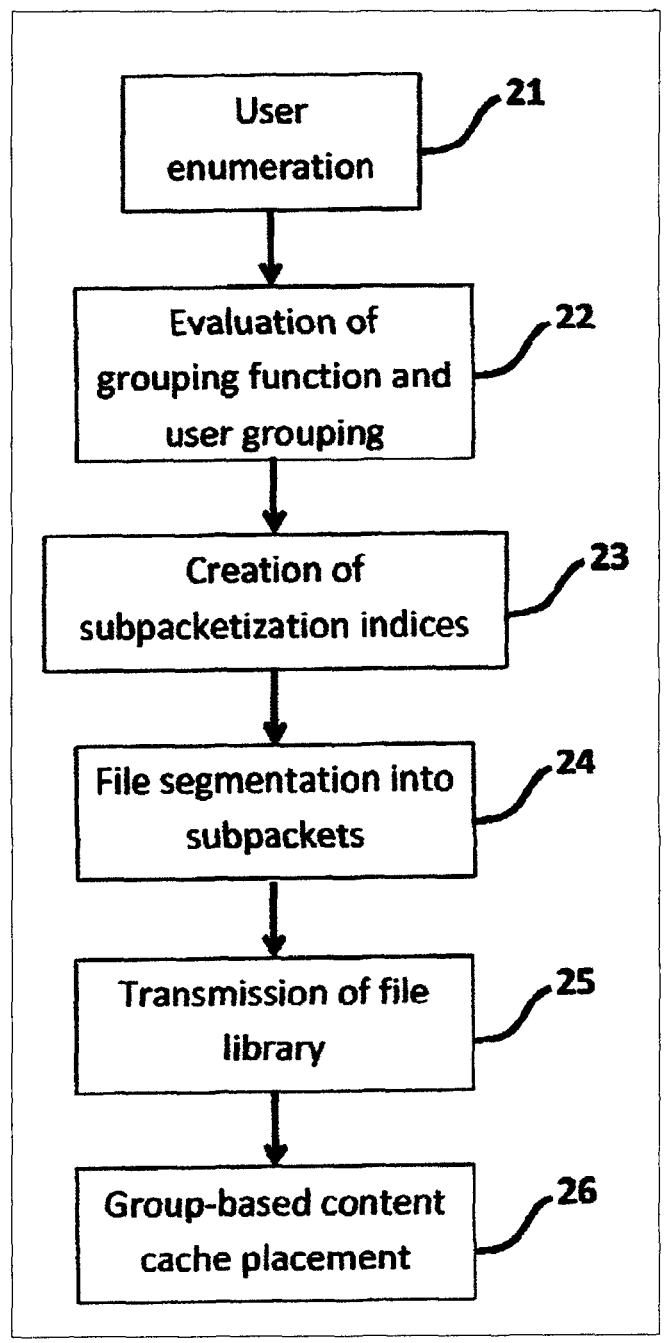
FIG. 2 illustrates one embodiment of a process leading to group-based caching at the receiving nodes.

Process that leads to content placement in the caches of the receiving nodes:

As illustrated in FIG. 2, the first process comprises the following steps 21-26 in sequence to be performed during the first time-slot.

Steps 21 and 22 are respectively "user enumeration" and "evaluation of grouping function and user grouping". With respect to those steps, users are enumerated and assigned into one of the groups.

$$\frac{K}{L}$$

groups. The grouping function will take as input, among other things, the user enumeration, the network topology (link strengths), as well as the cache capabilities of the different receiving nodes. In this specific embodiment here, where the link strengths are the same for each user, and where the cache sizes are also the same across the different receivers, the grouping function is simple and it assigns each group with L users, as follows: users $$\left\{1, \frac{K}{L}+1, \frac{2K}{L}+1, \ldots, \frac{(L-1)K}{L}+1\right\}$$

are placed in group 1, users $$\left\{2, \frac{K}{L}+2, \frac{2K}{L}+2, \ldots, \frac{(L-1)K}{L}+2\right\}$$

are placed in group 2, and so on.

The next step 23 is "Creation of subpacketization indices", which results in the calculation of subpacketization indices τ. To do this, we gather a set T that is some subset of S* sets τ, where each set τ consists of Q distinct numbers from $$\left\{1, 2, \ldots, \frac{K}{L}\right\}.$$

In some specific embodiments, Q can take the value $$Q = \frac{K\gamma}{L}.$$

A next step 24, so-called "File segmentation into subpaquets", consists in file segmentation, wherein each file $F_n$, (n=1,2, ..., N) is segmented into S* subfiles $F_{n,\tau}$, where each set τ in T is used to label a different segment of the file.

In the next—so called "Transmission of file library" step 25, the base station (B) sequentially transmits $x_1$ which maps information from $F_1, F_2, \ldots, F_N$, and each receiving node $N_k$ (k=1,2, ..., K) processes their received signal $f_k(x_1)$ to get an estimate of different parts of the library $F_1, F_2, \ldots, F_N$. The transmission is multicast or partial unicast and it can employ one or more transmit antennas.

At the completion of step 25, the first process of FIG. 2 then proceeds to a step 26—designated "Group-based content cache placement"—which consists in group-based caching, where each user, depending at least on its group, caches so that the cache overlap—corresponding to the amount of common subfiles—between any two caches, is calculated to be at least a function of whether the two caches belong in the same group or not. In this particular embodiment where the cache sizes are of the same size, and where the link strengths are statistically similar, the caching is as follows: Each user belonging to group i, $$\left(\text{where } i = 1, 2, \ldots, \frac{K}{L}\right),$$

caches every subfile $F_{n,\tau}$ as long as i can be found inside the set τ.

Process that leads to transmission of content by the base station B:

With respect to FIG. 3, there will now be described the second process to be performed in the second time slot, consisting of a sequence of steps 31-39, for gathering file requests (step 31), then creating the transmission indices for active groups (step 32), then identifying $K_g$ active groups (step 33), then gathering channel estimates for $K_g$ active groups (step 34), then creating the precoding vector for an active group (step 35), repeating for each active group (step 36), then combining the precoding vectors of the $K_g$ active groups (step 37), and then transmitting the composite vector simultaneously to all $K_g$ active groups (step 38). The process (32)-(38) is repeated for different sets of $K_g$ active groups (step 39).

More particularly, the process of FIG. 3 starts with a first step 31 being the gathering of file requests, where the receiving nodes request from the transmitter to deliver specific files from the library. In this first preferred embodiment, each receiving node $N_k$ requests one file, by communicating to the base station B the information that describes the label of their requested file $F_{r_k}$ ($r_k$=1,2, . . . , N).

Then, the process proceeds to a step 32, consisting of gathering transmission indices. In this step, indices $\chi$ are created that will describe which Q+1 groups will be active, which in turn describes which Q+1 groups to transmit to at any given time. To do this, the process gather a set X that is some subset of possible sets $\chi$, where each set $\chi$ consists of Q+1 distinct numbers from $$\left\{1, 2, \ldots, \frac{K}{L}\right\}.$$

Then, after completion of step 32, the process proceeds to a step 33, which is about identifying the active group. Here, sets $\chi$ are sequentially picked from X. Once a set $\chi$ is picked, this immediately identifies the Q+1 active groups, which include group i as long as i can be found in the set $\chi$. Thus each $\chi$ automatically identifies the L×(Q+1) so called 'active receiving nodes'. In some specific embodiments, Q+1 can take the value $$Q + 1 = \frac{K\gamma}{L} + 1.$$

Given a $\chi$, the step identifies (Q+1)×L active receiving nodes.

Then, in a step 34, the process performs the gathering channel estimates for the $K_g$ active groups, where each active receiving node $N_k$ communicates their channel state information $h_k$ to the transmitter. As known by a skilled man, this feedback can also take other forms, that include receiver state, precoder preference, location information, etc.

In a step 35, the process creates a precoding vector for an active group, by precoding L subfiles for L users in the active group. Here, for a given active group i, the transmitter generates the L-length signal vector $$w_{G_i}(\chi) \cdot (H_{G_i})^\perp$$

where $(H_{G_i})^\perp$ is the precoding matrix relative to the channel of group i, and where $$w_{G_i}(\chi) = \left[F_{r_{G_i(1),\chi\backslash i}}, F_{r_{G_i(2),\chi\backslash i}}, \ldots, F_{r_{G_i(L),\chi\backslash i}}\right]$$

is the vector comprised of the vector representation of the subfiles $$F_{r_{G_i(1),\chi\backslash i}}, F_{r_{G_i(2),\chi\backslash i}}, \ldots, F_{r_{G_i(L),\chi\backslash i}}$$

wanted by the L users to group i.

Then, in a step 36, the process repeats the above step (35) for each active group.

In a step 37, the process combines the precoding vectors $w_{G_i}(\chi) \cdot (H_{G_i})^\perp$ of the $K_g$ active groups, to form a composite vector $$x_{t_s} = \sum_{i \in \chi} w_{G_i}(\chi) \cdot (H_{G_i})^\perp$$

where the summation is over integer numbers i that comprise the currently chosen set $\chi$ of active groups.

In a step 38, the base-station B transmits the composite vector $x_{t_s}$ of length L, simultaneously to all $K_g$ active groups. Each scalar of the vector corresponds to one antenna of the transmitter.

At last, in a step 39, the process repeats the steps 32-38 for different sets of $K_g$ active groups.

Process of Decoding at the Receiving Nodes:

With respect to FIG. 4, there will now be described the third process—which is presented here from the point of view of any one user—for decoding at the receiving nodes and which comprises the sequence of steps 41-49 in sequence.

The third process starts with a step 41, designated "Is user in set of active groups?", wherein a test is performed to determine whether the user belongs to the upcoming transmission, which means that the receiver is active.

The result of the test is processed in a step 42.

If the user does not belong to the upcoming transmission, the process proceeds to a step 48—designated "Repeat for new set of Kg until file is received"—, wherein the receiver will wait until the next transmission.

If the user belongs to the upcoming transmission, the process proceeds to a step 43—designated "Receiver broadcast its channel information", the receiver will broadcast it's channel state information in a step 43.

Then, in a step 44 designated "Receiver records channel information from other active users", the receiver will listen for and record the other channel information from the other active users.

Then, the process proceeds to a step 45 designated "User receives signal meant for Kg active groups", wherein the receiver records the received signal which is meant for the active groups.

In a step 46—designated ""Cache-out" intergroup interfering messages based on group-based multicasting scheme"—, the receiver uses channel information and cached content to remove (cache-out) inter-group interference. This is achieved by using a state-of-art cache-aided multicasting method well known to a skilled man, and which is elevated in this step to a group-level such that, by design, the sets T and X, guarantee that all the elements of $$w_{G_i}(\chi) = \left[F_{r_{G_i(1),\chi\backslash i}}, F_{r_{G_i(2),\chi\backslash i}}, \ldots, F_{r_{G_i(L),\chi\backslash i}}\right]$$

are cached at the rest participating (active) groups' caches, except the one that desires them (i.e., except at the caches of group i). This means that each receiver of a specific active group, holds in its cache all the file segments that have been requested by the users of the other groups that are active at that particular instance.

In a step 47—designated ""Null-out" intra-group interference, Decode own subfile using precoding-based decoder", the receiver applies a standard decoder that reflects the employed state-of-art precoder, to receive its desired subfile. By design of the precoder-and-decoder (which for a specific embodiment can be a simple ZF precoder), a message decoded by a receiver does not contain any file segment intended for another receiver of the same group.

By combining steps (46) and (47), the receiver can remove all other Q unwanted subfiles, and decode its own subfile.

Step (48) consists of repeating the process (43) to (47), until the entire desired file is received.

Example Based on First Embodiment

Assume a base station B with L=4 transmit antennas, is deployed in a mall. Let there be a library of N=20 files (for example N=20 different movies) and let there be K=20 wireless users (previously referred to as receiving nodes) labeled by 1,2, . . . ,20. Let each receiving node k=1, 2, . . . ,20 have a cache (storage) of size corresponding to M=8 (equivalent to the size of 8 files), thus corresponding to a normalized cache size of $$\gamma = \frac{M}{N} = \frac{8}{20} = \frac{2}{5}.$$

1. Phase 1: Placement (first time slot)
  User enumeration and grouping: Users are divided into 5 groups of size L=4.
  The groups are $G_1=\{1, 6, 11, 16\}$ (group 1), $G_2=\{2, 7, 12, 17\}$ (group 2), $G_3=\{3, 8, 13, 18\}$ (group 3), $G_4=\{4, 9, 14, 19\}$ (group 4), and $G_5=\{5, 10, 15, 20\}$ (group 5).
  Subpacketization indices: We create the set T that includes $$S^* = \binom{\frac{K}{L}}{\frac{K\gamma}{L}} = \binom{5}{2} = 10$$

different sets $\tau$, where each set $\tau$ consists of $$Q = \frac{K\gamma}{L} = 2$$

distinct numbers from $\{1,2, \ldots ,5\}$. Thus T={(1,2), (1,3), (1,4), (1,5), (2,3), (2,4), (2,5), (3,4), (3,5), (4,5)}.
  File segmentation: Each file F_n (n=1,2, . . . , N) is segmented into S*=10 subfiles $F_{n,\tau}$ where each set $\tau$ in the above T is used. For example, file $F_1$ is segmented into subfiles $\{F_{1,(1,2)}, F_{1,(1,3)}, F_{1,(1,4)}, \ldots , F_{1,(4,5)}\}$ and similarly with the rest of the files $F_2, \ldots , F_{20}$.
  First phase transmission: The base station (B) sequentially transmits $x_1$ which maps information from $F_1, F_2, \ldots , F_N$.
  Group-based caching: Based on $x_1$, cache-placement commences, so that each user belonging to group i $$\left(i = 1, 2, \ldots , \frac{K}{L}\right)$$

caches every subfile $F_{n,\tau}$ as long as i can be found inside the set $\tau$. The cache placement is defined by the following: $Z_1=\{(1,2), (1,3), (1,4), (1,5)\}$ (cache for group 1), $Z_2=\{(1,2), (2,3), (2,4), (2,5)\}$ (cache for group 2), $Z_3=\{(1,3), (2,3), (3,4), (3,5)\}$ (cache for group 3), $Z_4=\{(1,4), (2,4), (3,4), (4,5)\}$ (cache for group 4), and $Z_5=\{(1,5), (2,5), (3,5), (4,5)\}$ (cache for group 5). This means that for example, all users of group 1 (i.e., users 1,6,11,16) will cache all subfiles $F_{n,(1,2)}, F_{n,(1,3)}, F_{n,(1,4)}, F_{n,(1,5)}$, for each file $F_n$. Similarly all users of group 2 (i.e., users 2,7,12,17) will cache all subfiles $F_{n,(1,2)}, F_{n,(2,3)}, F_{n,(2,4)}, F_{n,(2,5)}$, again for each file $F_n$, and so on. You can see that inter-group caches have 1 out of 5 parts in common (e.g. groups 1 and 2 have segments labeled by (1,2) in common), while intra-group caches have all elements in common (i.e., caches of the same group are identical).

2. Phase 2: Delivery (second time slot)
  File requests: Each user asks for any one file from the library, so user 1 asks for file $F_{r_1}$, user 2 for $F_{r_2}$, and so on, where $r_k=1,2, \ldots ,20$.
  Transmission indices and active group identification: We consider the set X={(1,2,3), (1,2,4), (1,2,5), (1,3,4), (1,3,5), (1,4,5), (2,3,4), (2,3,5), (2,4,5), (3,4,5)} consisting of sets x, where each set $\chi$ consists of Q+1=3 distinct numbers from the set {1,2,3,4,5}. Each different $\chi$ describes a different set of Q+1=3 active groups, corresponding to (Q+1)×L=12 active users. For example, when=(1,2,3), it means that the active groups are groups 1,2 and 3, which are the groups that the base station will transmit to, during this time.
  Feedback to transmitter and Transmission to groups: The first transmission is denoted by $x_{123}$ where the index implies that all users belonging in groups 1,2 and 3 are going to be receiving a desired subfile. Each active receiving node $N_k$ (i.e., any user from groups 1,2 or 3) communicates channel state information $h_k$ back to the transmitter. The transmitted vector, from the base station B to the active receivers, then takes the form $$x_{123} = (H_{G_1})^{-1} \cdot \begin{pmatrix} F_{r_1,(2,3)} \\ F_{r_6,(2,3)} \\ F_{r_{11},(2,3)} \\ F_{r_{16},(2,3)} \end{pmatrix} + (H_{G_2})^{-1} \cdot \begin{pmatrix} F_{r_2,(1,3)} \\ F_{r_7,(1,3)} \\ F_{r_{12},(1,3)} \\ F_{r_{17},(1,3)} \end{pmatrix} + (H_{G_3})^{-1} \cdot \begin{pmatrix} F_{r_3,(1,2)} \\ F_{r_8,(1,2)} \\ F_{r_{13},(1,2)} \\ F_{r_{18},(1,2)} \end{pmatrix}$$

Then, the received messages—focusing on the case of group 1 ($G_1=\{1,6,11,16\}$)—stacked as a vector to incorporate the received signals at users {1,6,11,16}, takes the form:

$$y_{123}(G_1) = \begin{pmatrix} F_{r_1,(2,3)} \\ F_{r_6,(2,3)} \\ F_{r_{11},(2,3)} \\ F_{r_{16},(2,3)} \end{pmatrix} + H_{G_1} \cdot (H_{G_2})^{-1} \cdot \begin{pmatrix} F_{r_2,(1,3)} \\ F_{r_7,(1,3)} \\ F_{r_{12},(1,3)} \\ F_{r_{17},(1,3)} \end{pmatrix} + H_{G_1} \cdot (H_{G_3})^{-1} \cdot \begin{pmatrix} F_{r_3,(1,2)} \\ F_{r_8,(1,2)} \\ F_{r_{13},(1,2)} \\ F_{r_{18},(1,2)} \end{pmatrix}$$

As seen from the above equation, each user in Group 1 receives the desired subfile plus a linear combination of all the subfiles intended for the users in the other participating groups (groups 2 and 3 in this case), where this linear combination depends on the channels of these K$\gamma$+L participating (active) users. By using the cached content and the knowledge of the channel coefficients, each user can decode their desired subfile.

In the same manner, we proceed with the rest of the transmissions, i.e., with the rest of the $\chi$ in, i.e., with $\chi=(1,2,4)$ corresponding to active groups 1,2 and 4, then with $\chi=(1,2,5)$ corresponding to active groups 1,2 and 5, and so on.

From the above algorithm we can see that there are $K\gamma+L$ users served at a time, while the number of file segments (subpacketization) is $$S^* = \binom{\frac{K}{L}}{\frac{K\gamma}{L}} = \binom{5}{2} = 10.$$

Without our method, the best known subpacketization needed to achieve this same performance would have been $$S^* = \binom{K}{K\gamma} \times \binom{K-K\gamma-1}{L-1} = \binom{20}{8} \times \binom{11}{3} = 125970 \times 165 = 20878050.$$

The complexity reduces from approximately twenty million (distinct transmissions), to just ten distinct transmissions.

Another interpretation of the above is that for any state-of-art placement-delivery which is constrained by the file size, the here proposed method can achieve a boost of L times on (cache-aided multicasting gains). Specifically, if a cache-aided multicasting algorithm can achieve multicasting gain of $\overline{G}_C$ for some maximum allowable number F of segments per file (maximum subpacketization level of F) then the here proposed algorithm can achieve a multicasting gain of $\min\{L \times \overline{G}_C, K\gamma+1\}$ under the same segmentation (complexity) constraint F.

II. Second Embodiment (Wired Network)

There will now be described a second embodiment which shows the invented role given to multiple servers and to the receiving nodes, in a wired network. The new approach combines the previously described technique of fusing multi-transmitter precoding with cache-aided multicasting, to again reduce the complexity of cache-aided multicasting algorithms, and to allow reduced transmission delays when delivering files of any given sizes, from a set of transmitting servers, to a set of receiving nodes.

Figure 5:
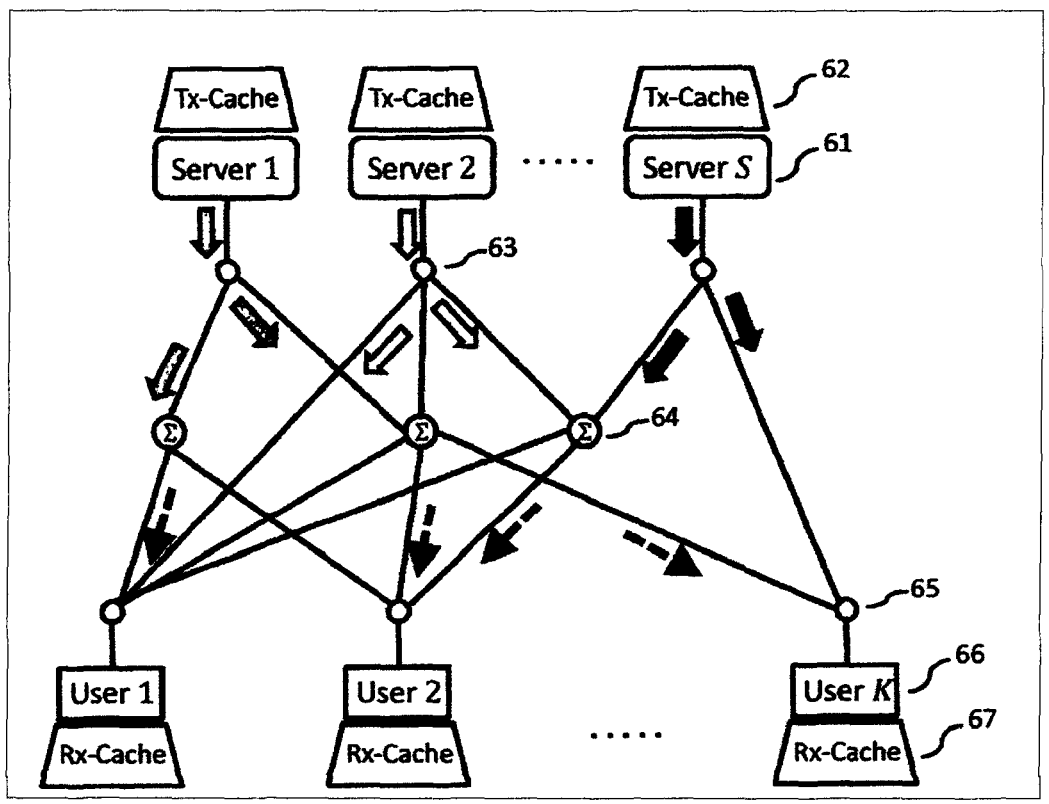
FIG. 5 shows a second embodiment corresponding to wired-network communications consisting of S transmitting servers (61), and K receiving users (66), via a network potentially consisting of routing nodes (63), collecting nodes (65), and potentially combining nodes (64). Receivers request content from a library of N files. Each transmitter has a cache (62) of size equal to the size of $M_T$ files, and each receiver has cache (67) of size equal to the size of M files.

FIG. 5 more particularly illustrates such second embodiment, showing S transmitting servers 61. As before, there is a library of N files, but each transmitting server only has access to the part of the library that is stored at the cache of that transmitter 62. Each transmitter cache 62, has size equal to the size of $M_T$ files. The transmitting servers aim to delivery data to K receiving users 66, each with cache 67 of size equal to the size of M files. The medium of communication is a wired network, potentially consisting of routing nodes 63 and collecting nodes 65, as well as potentially consisting of combining nodes 64 which can combine receiving inputs at the node, to produce a composite output from that node.

Figure 6:
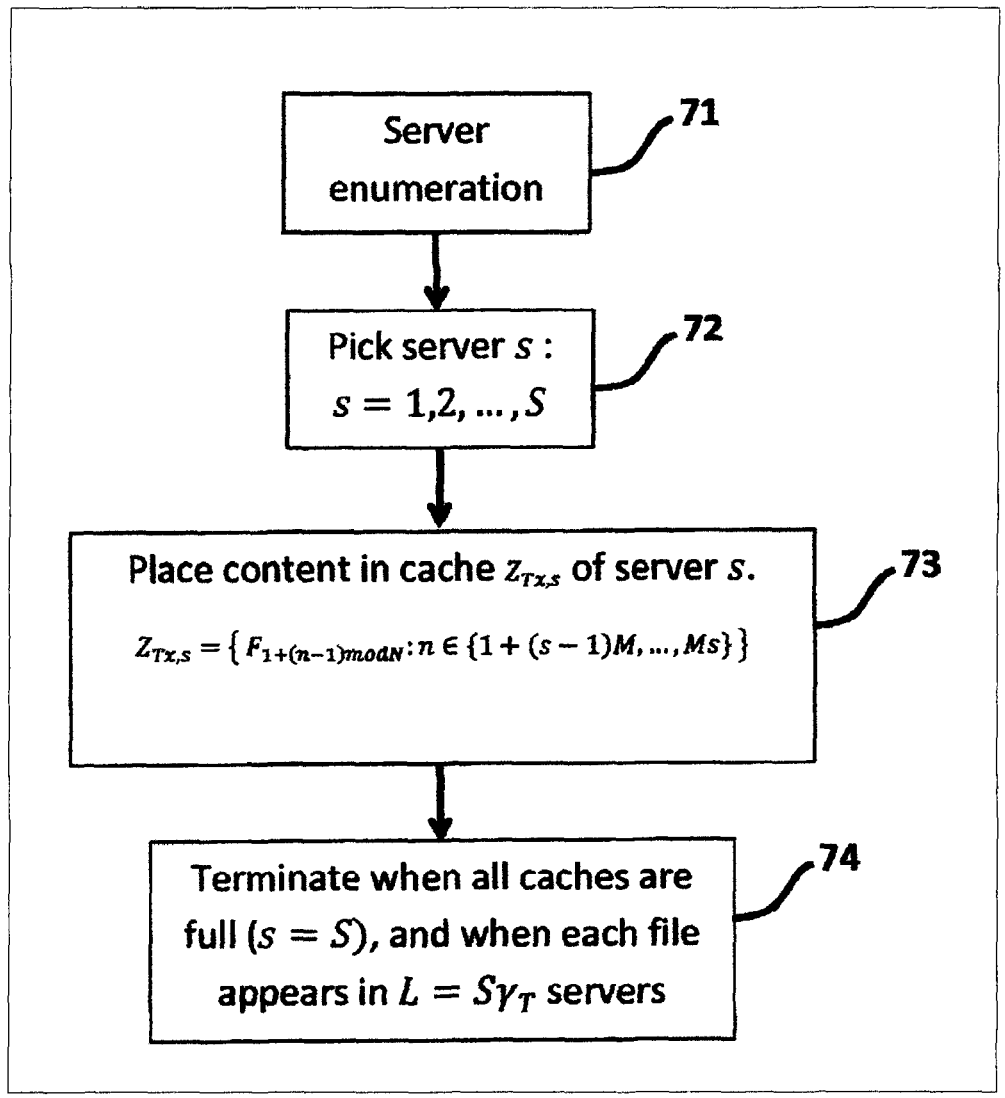
FIG. 6 illustrates an embodiment of a Caching process at transmitting servers in wireless network.
Figure 7:
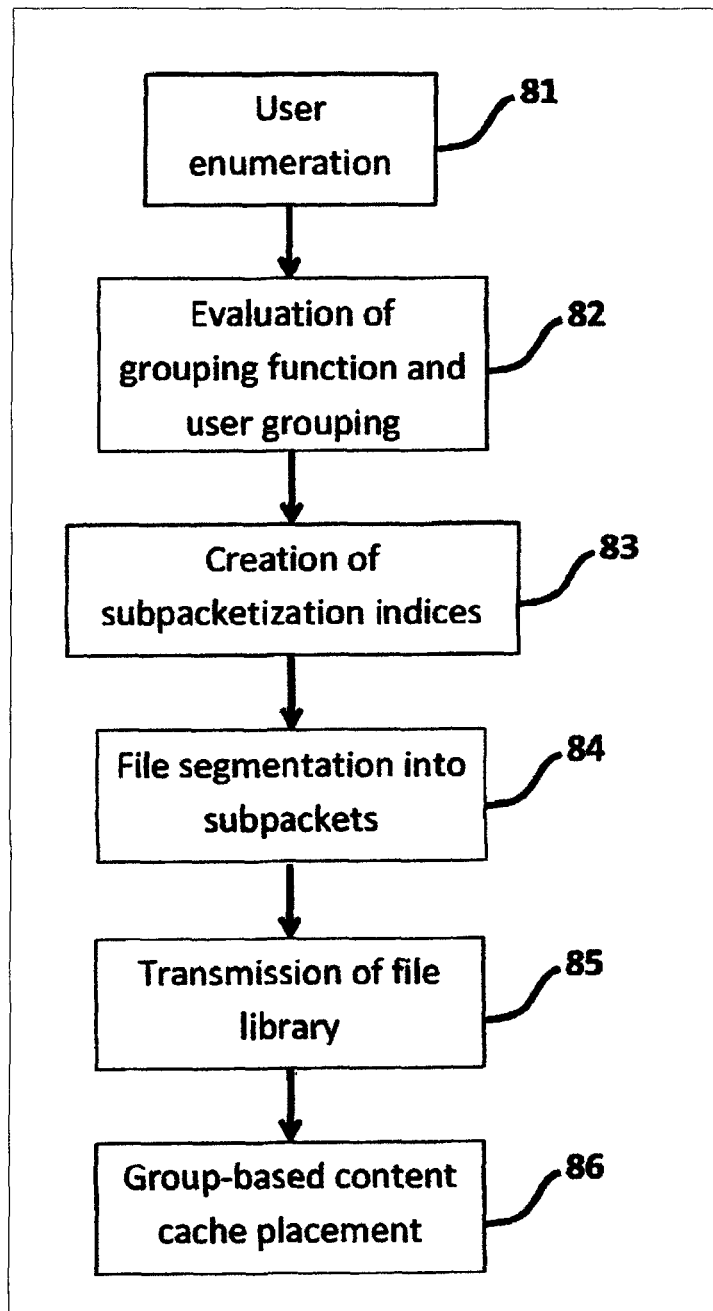
FIG. 7 illustrates a process for group-based cache placement in wired network of the second embodiment.
Figure 8:
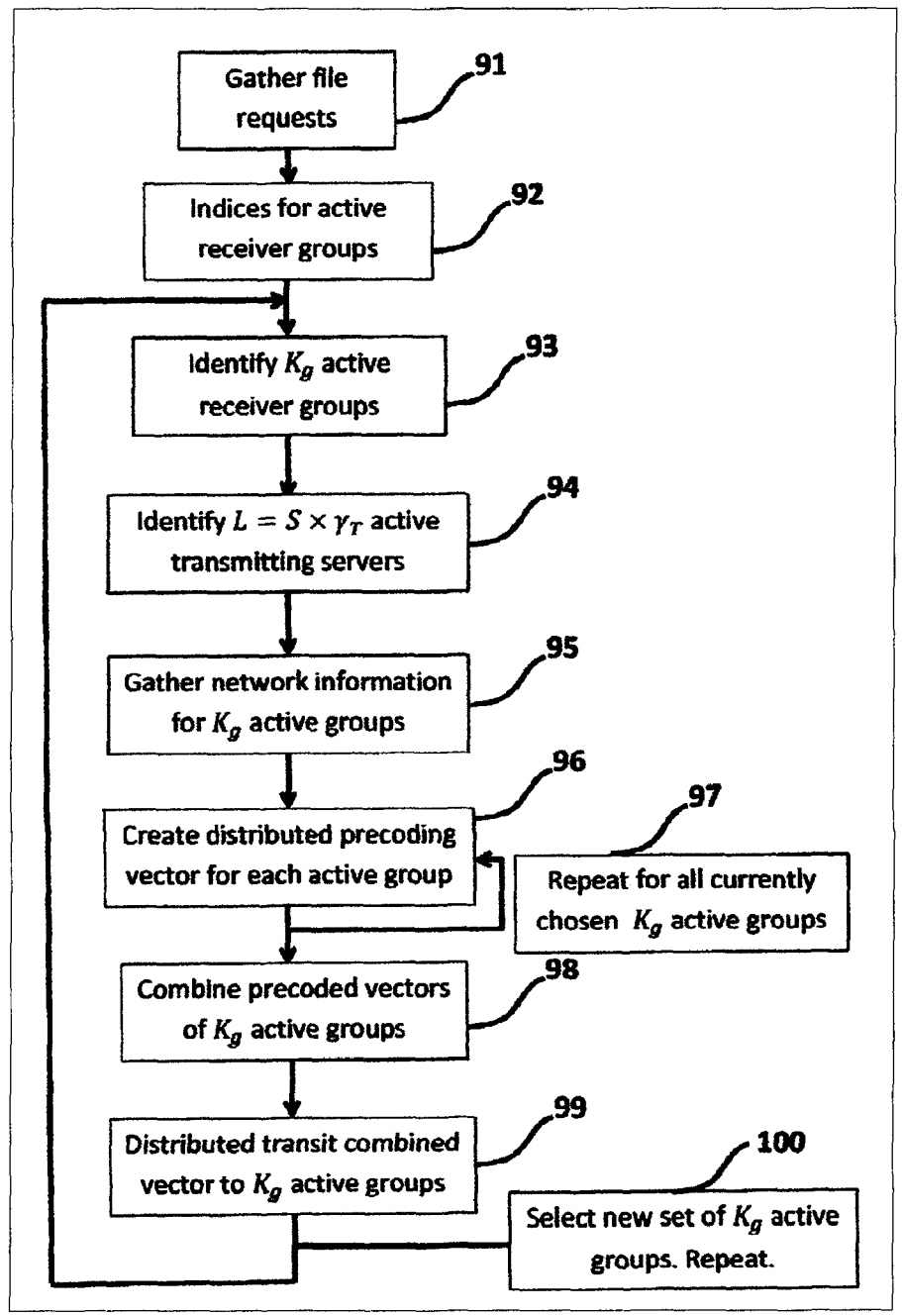
FIG. 8 illustrates a process of distributed transmission of requested data in wired network of the second embodiment. Delivery is done for $K_g$ receiver-node groups at a time.
Figure 9:
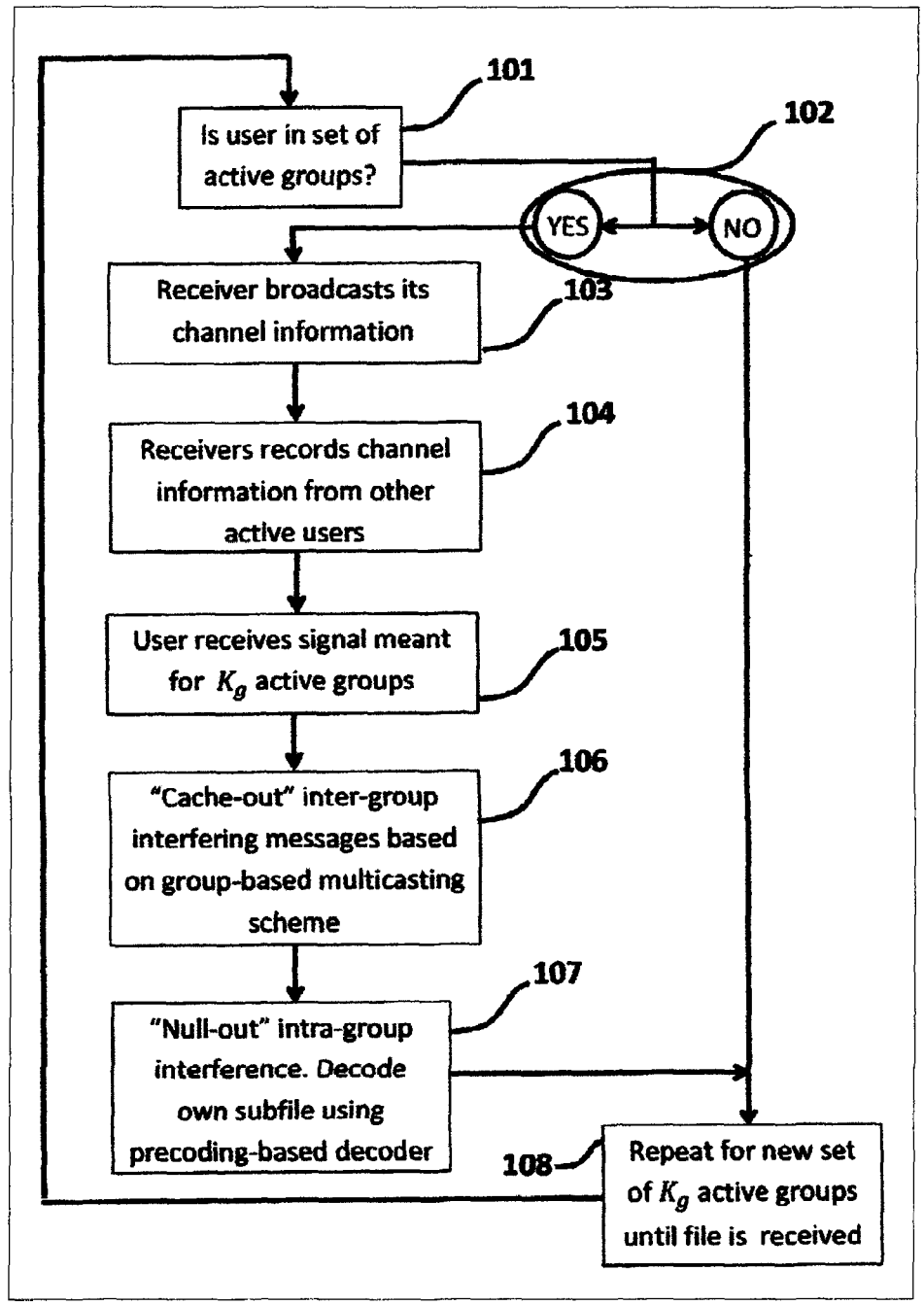
FIG. 9. illustrates an embodiment of a process of decoding requested subfile at receiving node in wired network of the second embodiment.

There are four distinct processes: the process that leads to content placement in the caches of the receiving nodes (FIG. 6), the process that leads to content placement in the caches of the receiving nodes (FIG. 7), the process that leads to transmission of content by the servers (FIG. 8), and the process of decoding at the receiving nodes (FIG. 9). One essential difference in this wired embodiment is that, unlike in the wireless embodiment which considered signals and channel-transfer functions to be consisting of real or complex numbers, here the network-transfer functions and the signals consist of elements from a finite field. By design, the size of the finite fields can be chosen to be large enough, so that the network transfer matrices can be of higher rank.

Process that leads to content placement in the caches of the transmitting servers: The first process, FIG. 6, starts with a step 71 consisting of server-enumeration where the servers are labeled as s=1,2, ..., S. The second step 72—designated "Pick servers: s=1, 2, ..., S" is the placement algorithm for the transmitter-side caches. For $$\gamma_T = \frac{M_T}{N},$$

the algorithm places, in a step 73, any subfile at exactly $S \times \gamma_T$ transmitting servers. These $S \times \gamma_T$ transmitting servers—for that specific subfile—can play the previous role of the $L = S \times \gamma_T$ transmit antennas of the single base station B. The algorithm consecutively caches entire files $F_1, F_2, \ldots, F_N$ into the transmitters, such that the first transmitter caches the first M files, the second transmitter the next M files, and so on, modulo N. Using $Z_{Tx,s}$ to denote the cache of transmitting server=1,2, ..., S, then $$Z_{Tx,s} = \{F_{1+(n-1) \bmod N} : n \in \{1+(s-1)M, \ldots, Ms\}\}.$$

This guarantees the memory constraints and the aforementioned requirement that each subfile resides in $S \times \gamma_T$ transmitters.

Later, in the transmission of any given subfile, these $S \times \gamma_T$ transmitters, with knowledge of the network topology (i.e., with network of the equivalent of CSIT, corresponding to the network transfer matrix), can now play the role of the aforementioned $L = S \times \gamma_T$ antennas, and thus can precode this said subfile using the exact same precoders described before, allowing for simultaneous separation of the $L = S \times \gamma_T$ streams within any given group $G_g$ of $L = S \times \gamma_T$ receivers. As before, the aforementioned caching allows for treatment of $$\frac{K}{L}\gamma+1$$

groups at a time, and a treatment of $S \times \gamma_T + K \times \gamma \leq K$ users at a time The process is terminated, in a step 74, when all caches are full (s=S), and when each file appears in $L = S \times \gamma_T$ servers.

Process that leads to content placement in the caches of the receiving nodes: This process, illustrated in FIG. 7, consists of the process of user-enumeration (step 81), calculation of grouping function and user grouping (step 82), calculation of the subpacketization indices (step 83), file segmentation (step 84), sequential transmission of content from the library of N files (step 85), and group-based cache placement (step 86). In the following we will set $L = S \times \gamma_T$ which will make some of the steps here similar to the steps of the first preferred embodiment where, in a wireless network, a base station B with L antennas was serving K receiving nodes.

With respect to the step of user enumeration (step 81) and user grouping (step 82), users are enumerated and assigned into groups as before. The grouping function will take as input, among other things, the user enumeration, the network topology and network connectivity, the role assigned to the combining nodes (64), as well as the cache capabilities of the different receiving nodes. Taking these parameters into consideration, the grouping function will be part of a basic optimization for decreasing the overall delay. In this specific embodiment here—where the link strengths are statistically the same for each user (the links have similar capacity in the long term), and where the cache sizes are also the same across the different receivers—the grouping function assigns each group with L users, as follows: users $$\left\{1, \frac{K}{L}+1, \frac{2K}{L}+1, \ldots, \frac{(L-1)K}{L}+1\right\}$$

in group 1, users $$\left\{2, \frac{K}{L}+2, \frac{2K}{L}+2, \ldots, \frac{(L-1)K}{L}+2\right\}$$

in group 2, and so on.

The next step 83 is to calculate the subpacketization indices $\tau$. This is done as before: a set T is created that is some subset of S* sets $\tau$, where each set $\tau$ consists of Q distinct numbers from $$\left\{1, 2, \ldots, \frac{K}{L}\right\}.$$

In some specific embodiments, Q can take the value $$Q = \frac{K\gamma}{L}.$$

The next step 84 is file segmentation, where each file $F_n$, (n=1,2, ..., N) is segmented into S* subfiles $F_{n,\tau}$, where each set $\tau$ in T is used to label a different segment of the file.

In the next step 85, the S servers sequentially transmit part of their content: each server s=1,2, ..., S transmits—one after the other—signals $x_s$ which map information from $F_1$, $F_2$, ..., $F_N$. At the same time, each receiving node $N_k$(k=1, 2, ..., K) then processes their received signal $f_k(x_1, x_2, \ldots, x_s)$ to get an estimate of different parts of the library $F_1, F_2, \ldots, F_N$. The transmission $x_s$ at each server can account for any previously transmitted content by the servers, and it can account for network connectivity.

The next step 86 is the step of group-based caching, where each user, depending at least on its group, caches so that the cache overlap—corresponding to the amount of common subfiles—between any two caches, is calculated to be at least a function of whether the two caches belong in the same group or not. In this particular embodiment where the cache sizes are of the same size, and where the link strengths are statistically similar, the caching is as follows: Each user belonging to group i, $$\left(\text{where } i = 1, 2, \ldots, \frac{K}{L}\right),$$

caches every subfile $F_{n,\tau}$ as long as i can be found inside the set $\tau$.

Process that leads to transmission of content by the S transmitting servers: The third process, FIG. 8, consists of steps 91-100 for gathering file requests (step 91), then creating the indices for active groups of receiving users (step 92), then identifying $K_g$ active groups of receiving users (step 93), then identifying $L=S\times\gamma_T$ active transmitting servers (step 94), then gathering network connectivity information for $K_g$ active groups (step 95), then creating the precoding vector for an active group (step 96), repeating for each of the $K_g$ currently active groups (step 97), then combining the precoding vectors of the $K_g$ currently active groups (step 98), and then transmitting the composite vector simultaneously to all $K_g$ currently active groups (step 99). The process (92)-(99) is repeated for different sets of $K_g$ active groups (step 100).

Step 91 starts the process with the action of file requests, where the receiving nodes request delivery of specific files from the library. In this preferred embodiment, each receiving node $N_k$ requests one file, by communicating to the transmitting servers the information that describes the label of that receiving node's requested file $F_{r_k}$ ($r_k$=1,2, ..., N). Furthermore, in this preferred embodiment, the file requests are treated concurrently.

Step 92 consists of creating indices for active receiver-node groups. In this step, indices $\chi$ are created that will describe which Q+1 receiver-node groups will be simultaneously active, which in turn describes which Q+1 groups to transmit at any given time. To do this, we gather a set X that is some subset of possible sets $\chi$, where each set $\chi$ consists of Q+1 distinct numbers from $$\left\{1, 2, \ldots, \frac{K}{L}\right\}.$$

Step 93 is about identifying the active receiver groups, among the subset of all possible groups. Here, sets $\chi$ are sequentially picked from X. Once a set $\chi$ is picked, this immediately identifies the Q+1 active groups, which include group i as long as i∈$\chi$, i.e., as long as the number i can be found in the set $\chi$. Thus each $\chi$ automatically identifies the L×(Q+1) so called 'active receiving nodes'. In some specific embodiments, Q+1 can take the value $$Q + 1 = \frac{K\gamma}{L} + 1.$$

Given a $\chi$, the step identifies (Q+1)×L active receiving nodes.

Step 94 consists in the identification of $L=S\times\gamma_T$ active transmitting servers. Recalling from process (step 72), the transmitter-side caching step guarantees the requirement that each subfile resides in $L=S\times\gamma_T$ transmitters. Consequently, given the set of requested files from step 91, and given the set of (Q+1)×L active receiving nodes from step (93), this step here 94, applies the transmitter-side placement formula $Z_{Tx,s}=\{F_{1+(n-1)modN}:n\in\{1+(s-1)M, \ldots, Ms\}\}$ to identify the $L=S\times\gamma_T$ transmitters that will deliver the requested subfiles.

Step 95 is about gathering the network connectivity and network transfer function information corresponding to the network between the $K_g$ active receiver-node groups (from step (93)) and the associated L transmitting servers (from step 94), such feedback can also take forms that include receiver state, precoder preference, location information, etc. Using basic techniques, this information—which describes the state of the wired communication medium, and which accounts for connectivity, attenuation coefficients, as well as for the actions of the combining nodes—is communicated among the receiving nodes, and to the currently transmitting servers.

Step 96 creates a distributed precoding vector for an active receiver-node group, by precoding L subfiles, across the L different transmitters, for L users in the active group. Here, for a given active group i, the associated L servers jointly generate (using knowledge of each other's state information) the L-length signal vector $$w_{G_i}(\chi) \cdot H_{G_i})^\perp$$

where $H_{G_i})^\perp$ is the precoding matrix relative to the channel between group i and the associated L servers, and where $$w_{G_i}(\chi) = [F_{r_{G_i(1)},\chi\backslash i}, F_{r_{G_i(2)},\chi\backslash i}, \ldots, F_{r_{G_i(L)},\chi\backslash i}]$$

is the vector comprised of the vector representation of the subfiles $$F_{r_{G_i(1)},\chi\backslash i}, F_{r_{G_i(2)},\chi\backslash i}, \ldots, F_{r_{G_i(L)},\chi\backslash i}$$

wanted by the L users to group i. As stated before, one essential difference here is that $w_{G_i}(\chi)$, $H_{G_i}$, and by extension $(H_{G_i})^\perp$ and $w_{G_i}(\chi) \cdot (H_{G_i})^\perp$ consist of elements from a finite field, unlike in the wireless embodiment which considers channels and signals consisting of real or complex numbers. By design, the size of the finite fields can be chosen to be large enough, so that the transfer matrices $H_{G_i}$ can be of higher rank.

Step 97 repeats the above step (96) for each active group.

Step 98 combines the precoding vectors $w_{G_i}(\chi) \cdot (H_{G_i})^\perp$ of the $K_g$ active groups, to form a composite vector $$x_{t_s} = \sum_{i \in \chi} w_{G_i}(\chi) \cdot (H_{G_i})^\perp$$

where the finite-field summation is over integer numbers i that comprise the currently chosen set $\chi$ of active groups.

In step 99, the L currently chosen servers jointly the composite vector $x_{t_s}$ of length L, simultaneously to all $K_g$ active groups. Each scalar of the vector corresponds to one server.

Step 100 consists of repeating the process (92)-(99) for different sets of $K_g$ active receiver-node groups and potentially different sets of active servers.

Process of decoding at the receiving nodes: In this embodiment, the steps of the fourth process for decoding are presented in FIG. 9, steps 101-109. The process—which is presented here from the point of view of any one receiving user—consists of the step where the user is notified or calculates (step 101) if it belongs in the upcoming transmission, which means that the receiver is active. If NO (step 102), the receiver will wait until the next transmission to recheck (step 106). If YES (step 102), the receiver will broadcast it's network state information (step 103), and then it will listen for and record (step 104) the other channel information from the other active users. Then the receiver records the received signal (step 105) which is meant for the active groups.

In step (106) the receiver uses network-state information and cached content to remove (cache-out) inter-group interference. This is achieved by using a state-of-art cache-aided multicasting method, which is elevated in this step to a group-level such that it guarantees that all the elements of $$w_{G_i}(\chi) = [F_{r_{G_i(1)},\chi\backslash i}, F_{r_{G_i(2)},\chi\backslash i}, \ldots, F_{r_{G_i(L)},\chi\backslash i}]$$

are cached at the rest participating (active) groups' caches, except the one that desires them (i.e., except at the caches of group i). This means that each receiver of a specific active group, holds in its cache all the file segments that have been requested by the users of the other groups that are active at that particular instance.

In step 107, the receiver applies a standard decoder that reflects the employed state-of-art precoder, to receive its desired subfile. By design of the precoder-and-decoder (which for a specific embodiment can be a simple ZF precoder), a message decoded by a receiver does not contain any file segment intended for another receiver of the same group.

By combining steps 46 and 47, the receiver can remove all other Q unwanted subfiles, and decode its own subfile.

Step 108 consists of repeating the process 43) to 47, until the entire desired file is received.

III. Third Embodiment (D2D)

There will now be described a preferred third embodiment which shows the invented role given to wireless nodes sharing the same medium wanting to exchange files. The new approach leverages cooperation between the nodes to overcome subpacketization constraints. In theory, in a subpacketization unconstrained system, it was shown [1] that it is order optimal to multicast coded packets to Kγ nodes at a time, where K is the number of nodes and $$\gamma = \frac{M}{N}$$

is the fractional capacity of each cache storing M files out of a library of N files. In practice though, these gains are severely limited by the aforementioned required subpacketization. The new approach invented here manages to satisfy the demands of Kγ users at a time, by employing a first-of-its-kind node cooperation that dramatically reduces the subpacketization requirements and which thus dramatically boosts the rate-performance of the system. The invention involves the cooperation of L≤Kγ nodes at a time, were these cooperating nodes create a distributed precoded vector with messages for Kγ other nodes which are served simultaneously with reduced subpacketization. The invented approach allows for a small number of cooperating nodes, but offers exponential reductions in the subpacketization costs, while still achieving the full gain of serving Kγ users at a time.

Figure 10:
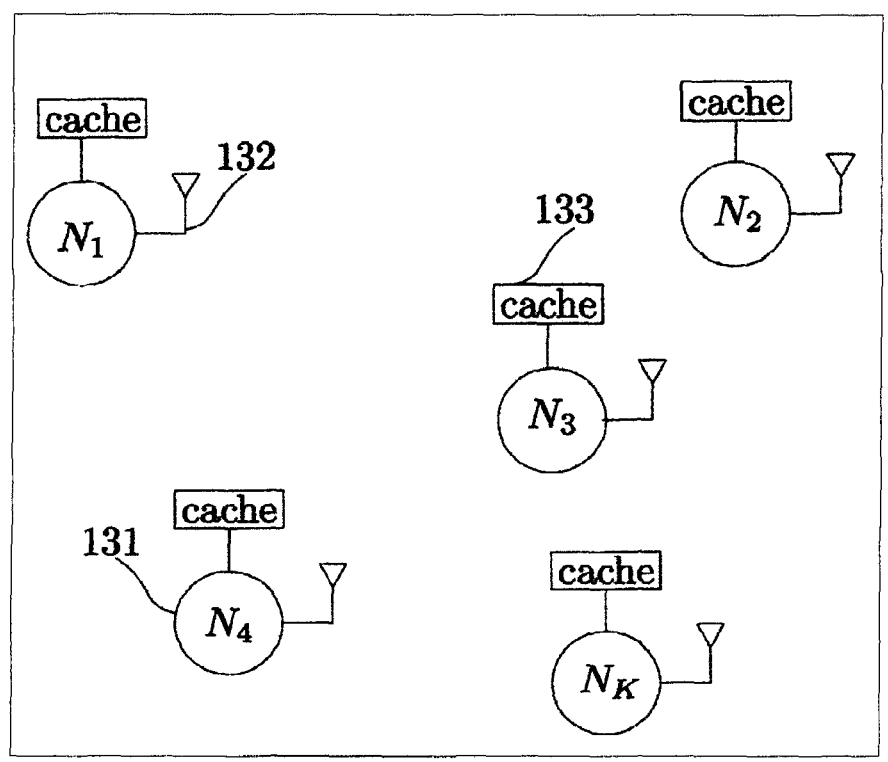
FIG. 10 illustrates the D2D Model of a third embodiment.

The preferred embodiment, illustrated in FIG. 10, corresponds to K independent nodes $N_1, N_2, \ldots, N_K$ (131), each with a single antenna (132), and each equipped with a cache (133) of size equal to M files out of a library of N files.

Figure 12:
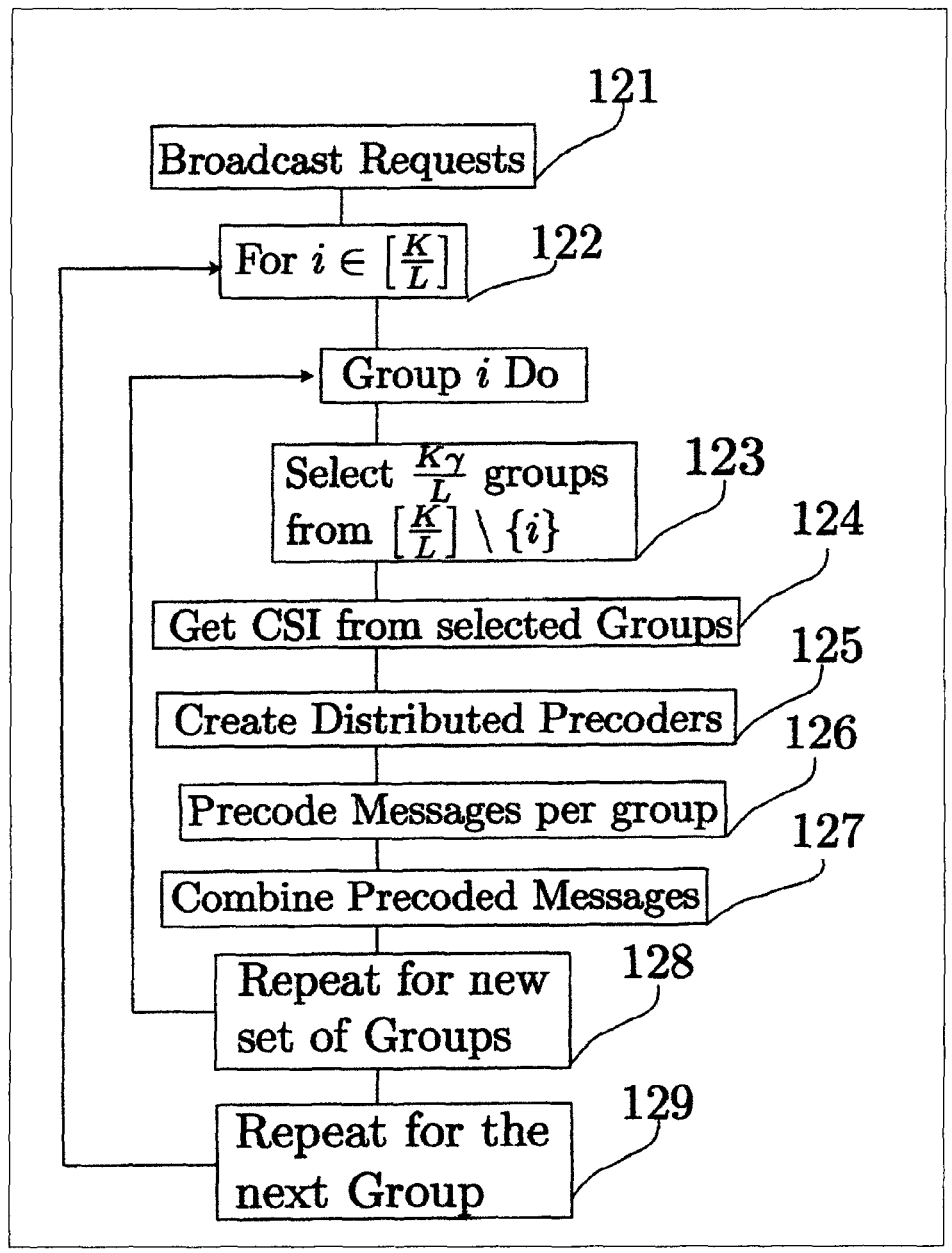
FIG. 12 illustrates the D2D Content Transmission Process in the third embodiment.
Figure 13:
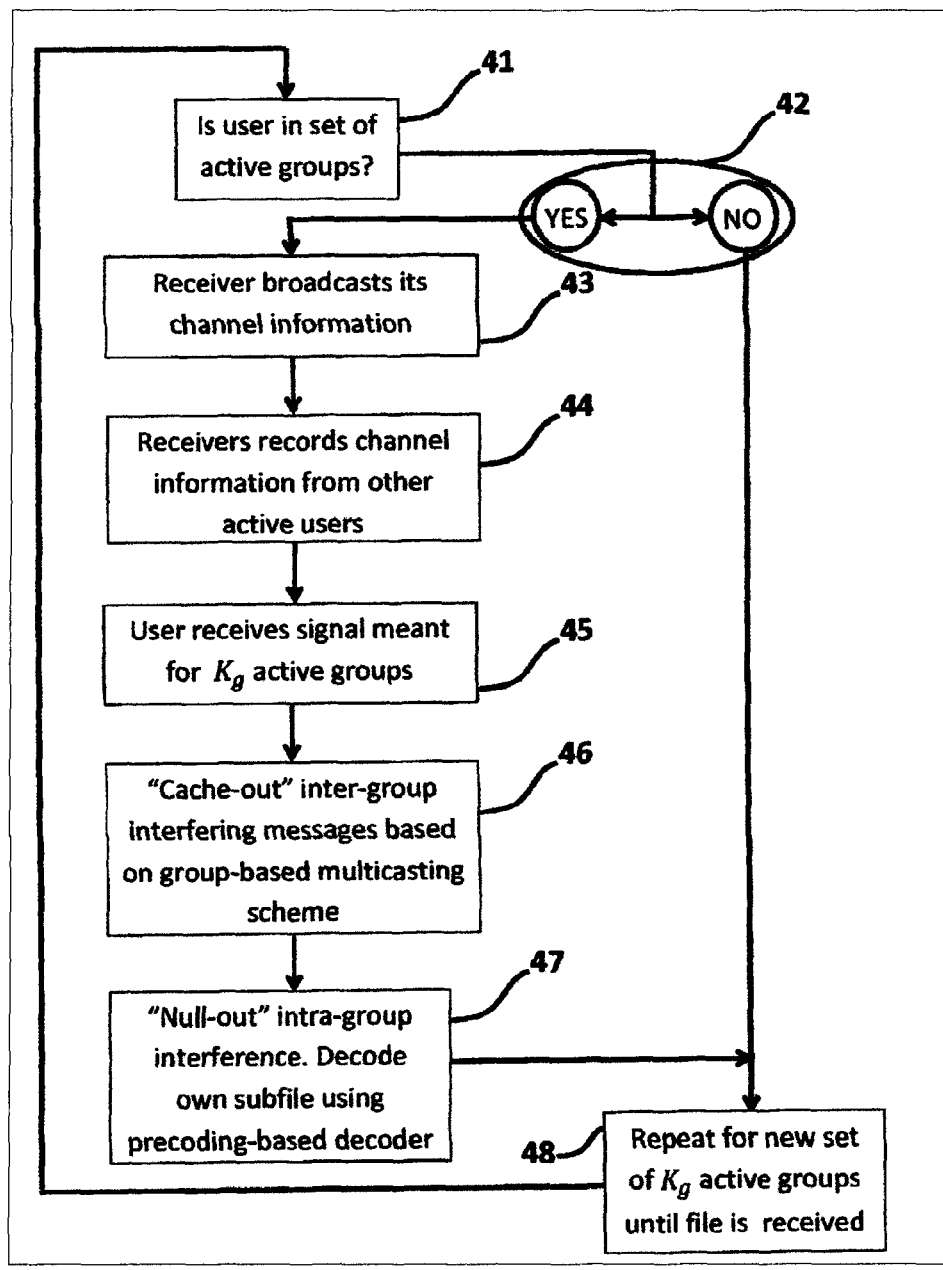
FIG. 13 illustrates the Decoding Process in the D2D embodiment in the third embodiment.

In this third embodiment, there are three basic processes embodying two time slots: i) the process, of the first time slot, that leads to content placement in the caches of the nodes (FIG. 11), ii) the process of the second time slot that leads to transmission of content by the nodes (FIG. 12), and iii) the process of decoding at the nodes (FIG. 13).

Figure 11:
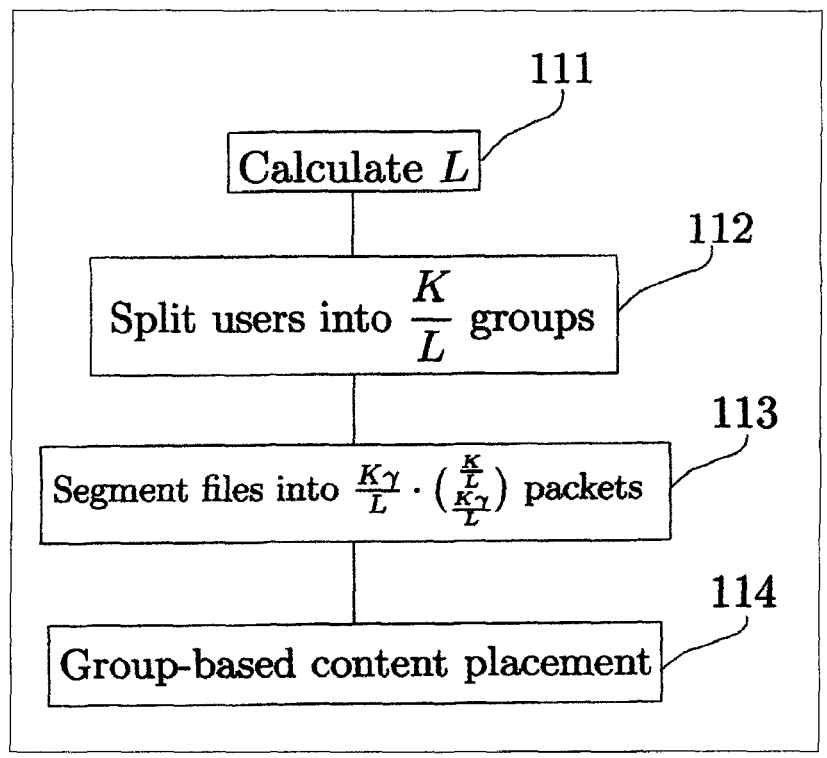
FIG. 11 illustrates the D2D Content Placement Process in the third embodiment.

Process that leads to content placement in the caches of the nodes:

As illustrated in FIG. 11, the first process comprises the following steps 111-114 in sequence to be performed during the first time-slot. In step (111) the number of cooperating nodes L is to be decided. One such L could be the smallest integer satisfying the subpacketization constraint $$\frac{K\gamma}{L}\binom{K/L}{K\gamma/L} \leq S^*,$$

where S* is the maximum allowed subpacketization. Then in step (112), users are assigned into one of the $$\frac{K}{L}$$

groups, for example as follows: users $$\left\{1, \frac{K}{L}+1, \frac{2K}{L}+1, \ldots, \frac{(L-1)K}{L}+1\right\}$$

are placed in group 1, users $$\left\{2, \frac{K}{L}+2, \frac{2K}{L}+2, \ldots, \frac{(L-1)K}{L}+2\right\}$$

are placed in group 2, and so on. The next step 113 is "File Segmentation" which starts with the calculation of subpacketization indices τ. To do this, we gather the set $$P = \left\{1, 2, \ldots, \frac{K\gamma}{L}\right\}$$

and the set T that is some subset of $$\left[\frac{K}{L}\right]$$

with $$\left[\frac{K\gamma}{L}\right]$$

distinct elements.

In the file segmentation wherein each file $F_n$ (n∈{1, 2, . . . , N}) is segmented into S* subfiles $F_{n,p,\tau}$, where each subset (p,τ)∈P×T is used to label a different segment of the file.

At step 114, named "Group-based content cache placement", where content is saved in each user according to the group a user belong to. For example, users in Group i store all files $$F_{n,p,\tau}: \forall n \in [N], \forall p \in \left[\frac{K\gamma}{L}\right], i \in \tau.$$

Process that Leads to Transmission of Content by the Nodes:

With respect to FIG. 12, there will now be described the second process to be performed in the second time slot, consisting of a sequence of steps 121-129, for gathering file requests (step 121), then, each group in sequence (122) selects some groups, for example $$\frac{K\gamma}{L}$$

groups (123) gets channel state information from these groups, (124) creates a distributed precoder for each group (125), precodes messages for each group using these precoders (126), combines the precoded messages (127) and repeats the process for a new set of groups (128). Finally, the process is repeated using a next group as a transmitter.

Process of decoding at the receiving nodes:

With respect to FIG. 13, there will now be described the third process—which is presented here from the point of view of any one user—for decoding at the receiving nodes and which comprises the sequence of steps 141-149 in sequence.

The third process starts with a step 141, designated "Is user in set of active groups?", wherein a test is performed to determine whether the user belongs to the upcoming transmission, which means that the receiver is active.

The result of the test is processed in a step 142.

If the user does not belong to the upcoming transmission, the process proceeds to step 148—designated "Repeat for new set of $K_g$ until file is received", wherein the receiver will wait until the next transmission.

If the user belongs to the upcoming transmission, the process proceeds to a step 143—designated "Receiver broadcasts its channel information", the receiver will broadcast its channel state information in step 143.

Then, in step 144 designated "Receiver records channel information from other active users", the receiver will listen for and record channel information from the other active users.

Then, the process proceeds to a step 145 designated "User receives signal meant for $K_g$ active groups", wherein the receiver records the received signal which is meant for the active groups.

In a step 146—designated "Cache-out" intergroup interfering messages based on group-based multicasting scheme", the receiver uses channel information and cached content to remove (cache-out) inter-group interference. This is achieved by using a state-of-art cache-aided multicasting method well known to a skilled man, and which is elevated in this step to a group-level such that, by design, the sets T and X, guarantee that all the elements of $$w_{G_i}(\chi) = \left[F_{r_{G_i(1),\chi^i}}, F_{r_{G_i(2),\chi^i}}, \ldots, F_{r_{G_i(L),\chi^i}}\right]$$

are cached at the rest participating (active) groups' caches, except the one that desires them (i.e., except at the caches of group i). This means that each receiver of a specific active group holds in its cache all the file segments that have been requested by the users of the other groups that are active at that particular instance.

In a step 147—designated "Null-out intra-group interference, Decode own subfile using precoding-based decoder", the receiver applies a standard decoder that reflects the employed state-of-art precoder, to receive its desired subfile. By design of the precoder-and-decoder (which for a specific embodiment can be a simple ZF precoder), a message decoded by a receiver does not contain any file segment intended for another receiver of the same group.

By combining steps (146) and (147), the receiver can remove all other $K\gamma-1$ unwanted subfiles, and decode its own subfile.

Step (148) consists of repeating the process (143) to (147), until the entire desired file is received.

Example Based on Third Embodiment

Assume a library of N=20 files (for example N=20 different movies) and let there be K=20 wireless users labeled by 1,2, . . . ,20. Let each receiving node k=1, 2, . . . ,20 have a cache (storage) of size corresponding to M=8 (equivalent to the size of 8 files), thus corresponding to a normalized cache size of $$\gamma = \frac{M}{N} = \frac{8}{20} = \frac{2}{5}.$$

In theory, the number of users potentially served simultaneously is 8, but requires a file to be segmented in ~1 million subfiles. If the constraint on the number of subfiles was 300 then there could only be multicasting gains of 2. To tackle this, and avoid as much of the overhead associated with user cooperation, we will divide users in 5 groups.

3. Phase 1: Placement (First Time Slot)
   User enumeration and grouping: Users are divided into 5 groups of size L=4. The groups are $G_1$={1, 6, 11, 16} (group 1), $G_2$={2, 7, 12, 17} (group 2), $G_3$={3, 8, 13, 18} (group 3), $G_4$={4, 9, 14, 19} (group 4), and $G_5$={5, 10, 15, 20} (group 5).
   Subpacketization indices: We create the set T that includes $$S^* = \binom{\frac{K}{L}}{\frac{K\gamma}{L}} = \binom{5}{2} = 10$$

different sets $\tau$, where each set $\tau$ consists of $$Q = \frac{K\gamma}{L} = 2$$

distinct numbers from {1,2, . . . ,5} and, the set P={1,2}. Thus, T={(1,2), (1,3), (1,4), (1,5), (2,3), (2,4), (2,5), (3,4), (3,5), (4,5)} and a subfile is defined by three indices, the file associated with it, the number from set P and the pair from set T.

File segmentation: Each file F_n (n=1,2, . . . , N) is segmented into S*=20 subfiles $F_{n,p,\tau}$ where each set $\tau$ in the above T is used and $p \in \{1,2\}$. For file into example, $F_1$ is segmented subfiles {$F_{1,1(1,2)}$, $F_{1,2(1,2)}$, $F_{1,(1,3)}$, $F_{1,2(1,3)}$, $F_{1,1(1,4)}$, . . . , $F_{1,2(4,5)}$} and similarly with the rest of the files $F_2$, . . . , $F_{20}$.

First phase transmission: A base station (B) sequentially transmits $x_1$ which maps information from $F_1$, $F_2$, . . . , $F_N$.

Group-based caching: Based on $x_1$, cache-placement commences, so that each user belonging to group i, $$\left(i = 1, 2, \ldots, \frac{K}{L}\right)$$

caches every subfile $F_{n,p,\tau}$ as long as i can be found inside the set $\tau$. The cache placement indices are defined as follows:

$$Z_1 = \left\{\begin{array}{l}(1,(1,2)),(2,(1,2))(1,(1,3)),(2,(1,3))\\(1,(1,4)),(2,(1,4)),(1,(1,5)),(2,(1,5))\end{array}\right\}(\text{cache for group 1}),$$

$$Z_2 = \left\{\begin{array}{l}(1,(1,2)),(2,(1,2))(1,(2,3)),(2,(2,3))\\(1,(2,4)),(2,(2,4)),(1,(2,5)),(2,(2,5))\end{array}\right\}(\text{cache for group 2}),$$

$$Z_3 = \left\{\begin{array}{l}(1,(1,3)),(2,(1,3))(1,(2,3)),(2,(2,3))\\(1,(3,4)),(2,(3,4)),(1,(3,5)),(2,(3,5))\end{array}\right\}(\text{cache for group 3}),$$

$$Z_4 = \left\{\begin{array}{l}(1,(1,4)),(2,(1,4))(1,(2,4)),(2,(2,4))\\(1,(3,4)),(2,(3,4)),(1,(4,5)),(2,(4,5))\end{array}\right\}(\text{cache for group 4}),$$

$$Z_5 = \left\{\begin{array}{l}(1,(1,5)),(2,(1,5))(1,(2,5)),(2,(2,5))\\(1,(3,5)),(2,(3,5)),(1,(4,5)),(2,(4,5))\end{array}\right\}(\text{cache for group 5}),$$

4. Phase 2: Delivery (Second Time Slot)
   File requests: Each user asks for any one file from the library, so user 1 asks for file $F_{r_1}$, user 2 for $F_{r_2}$, and so on, where $r_k \in \{1,2, \ldots 20\}$.
   First, Group 1 assumes the role of a distributed transmitter assigned with the task to send to all other groups. It does so by forming all sets of size two from the set {2,3,4,5}, i.e.

$$\chi \in \left\{\begin{array}{l}(2,3),(2,4),(2,5),\\(3,4),(3,5),(4,5)\end{array}\right\}.$$

Feedback to transmitters and Transmission to groups: The first transmission is denoted by $x_{1,23}$ where the index implies that all users belonging in group 1 will transmit messages to users in groups 2 and 3. Each active receiving node $N_k$ (i.e., any user from groups 2 or 3) communicates channel state information $h_k$ back to the transmitters. The transmitted vector, from group 1 to the active receivers, then takes the form $$x_{1,23} = (H_{G_2})^{-1} \cdot \begin{pmatrix} F_{r_2,(1,1,3)} \\ F_{r_7,(1,1,3)} \\ F_{r_{12},(1,1,3)} \\ F_{r_{17},(1,1,3)} \end{pmatrix} + (H_{G_3})^{-1} \cdot \begin{pmatrix} F_{r_3,(1,1,2)} \\ F_{r_8,(1,1,2)} \\ F_{r_{13},(1,1,2)} \\ F_{r_{18},(1,1,2)} \end{pmatrix}.$$

Then, the received messages—focusing on the case of group 2 ($G_1$={2,7,12,17})—stacked as a vector to incorporate the received signals at users {2,7,12,17}, takes the form:

$$y_{1,23} = (G_2) \begin{pmatrix} F_{r2,(1,1,3)} \\ F_{r7,(1,1,3)} \\ F_{r12,(1,1,3)} \\ F_{r17,(11,3)} \end{pmatrix} + H_{G_2} \cdot (H_{G_3})^{-1} \cdot \begin{pmatrix} F_{r3,(1,1,2)} \\ F_{r8,(1,1,2)} \\ F_{r13,(1,1,2)} \\ F_{r18,(1,1,2)} \end{pmatrix}.$$

As seen from the above equation, each user in Group 2 receives the desired subfile plus a linear combination of all the subfiles intended for the users in the other participating group (group 3 in this case), where this linear combination depends on the channels of these $K\gamma$ participating (active) users. By using the cached content and the knowledge of the channel coefficients, each user can decode their desired subfile.

In the same manner, we proceed with the rest of the transmissions, i.e., with the rest of the transmissions from Group 1 and then move to the transmissions from Group 2, Group 3 and so on.

From the above algorithm we can see that there are $K\gamma$ users served at a time, while the number of file segments (subpacketization) is $$S^* = \frac{K\gamma}{L}\binom{\frac{K}{L}}{\frac{K\gamma}{L}} = \binom{5}{2} = 20.$$

Without our method, the best known subpacketization needed to achieve this same performance would have been $$S^* = K\gamma \binom{K}{K\gamma} = 8 \cdot \binom{20}{8} = 8 \times 125970 \approx 10^6.$$

The complexity reduces from approximately 1 million (distinct transmissions), to just 20 distinct transmissions.

REFERENCES

[1] Ji, M., Caire, G., & Molisch, A. F. (2016). Fundamental limits of caching in wireless D2D networks. *IEEE Transactions on Information Theory*, 62(2), 849-869.

IV. Forth Embodiment (Distributed Wireless)

There will now be described a preferred forth embodiment which shows the invented role given to distributed base stations each with one or more antennas employed to serve receiving nodes. The new approach combines multi-antenna precoding with cache-aided multicasting and manages to reduce the complexity associated with cache-aided multicasting algorithms and to allow for much reduced transmission delay when delivering files of any given sizes.

Figure 14:
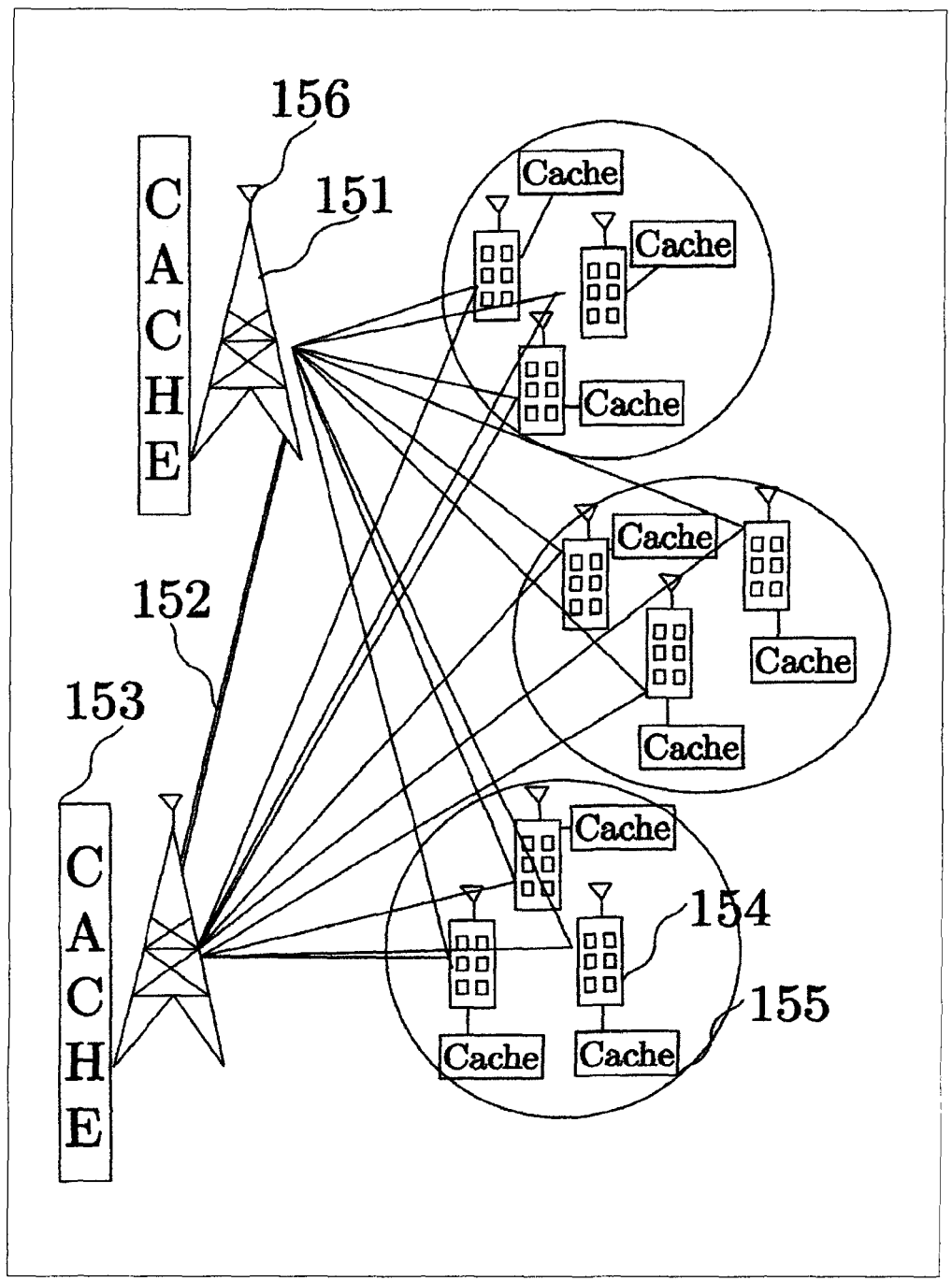
FIG. 14 illustrates the Distributed Based Stations of a fourth embodiment

The preferred embodiment, FIG. 14, corresponding to a number of base stations $K_T$ 151, each comprised of 1 or more antennas 155, connected via a connection for cooperation and/or coordination 152 and which could be wireless or wired or hybrid (wireless and wired) and having a cache size equal to $M_T$ files from a library of N files 153, serving K users 154, each fitted with a cache 155 storage of size equal to the size of M files.

Figure 15:
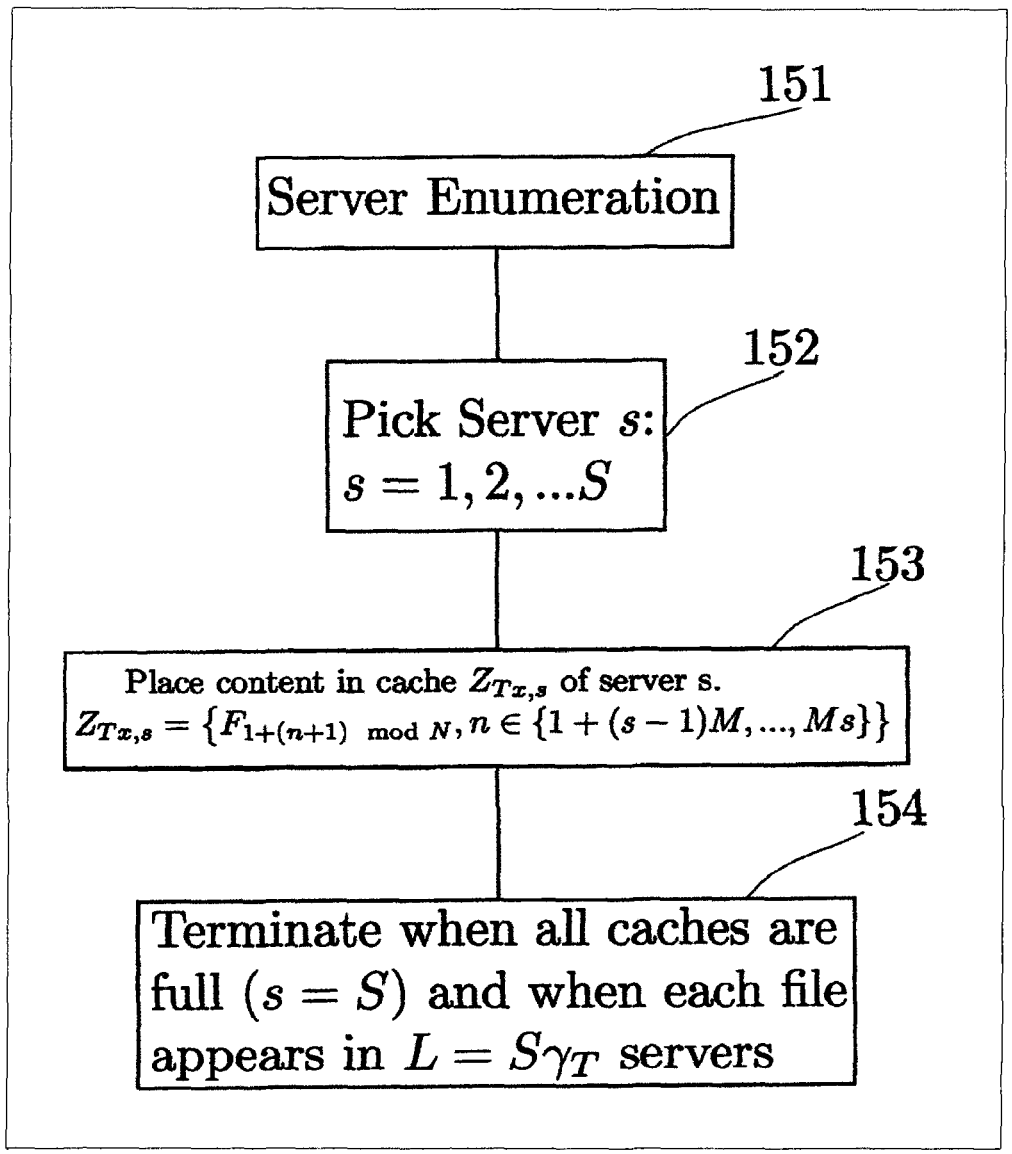
FIG. 15 illustrates the Content Placement at the Transmitters in the fourth embodiment.
Figure 17:
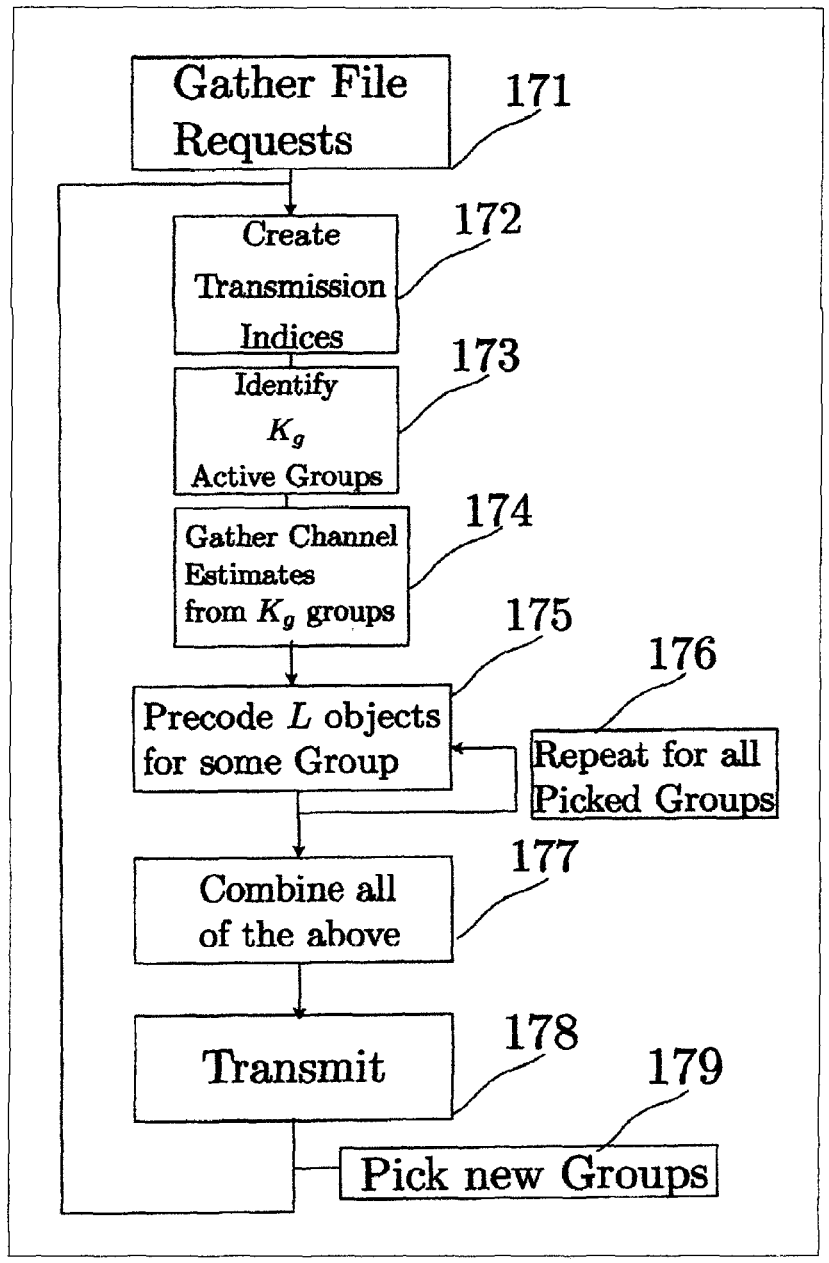
FIG. 17 illustrates the Delivery of Content in the fourth embodiment.
Figure 18:
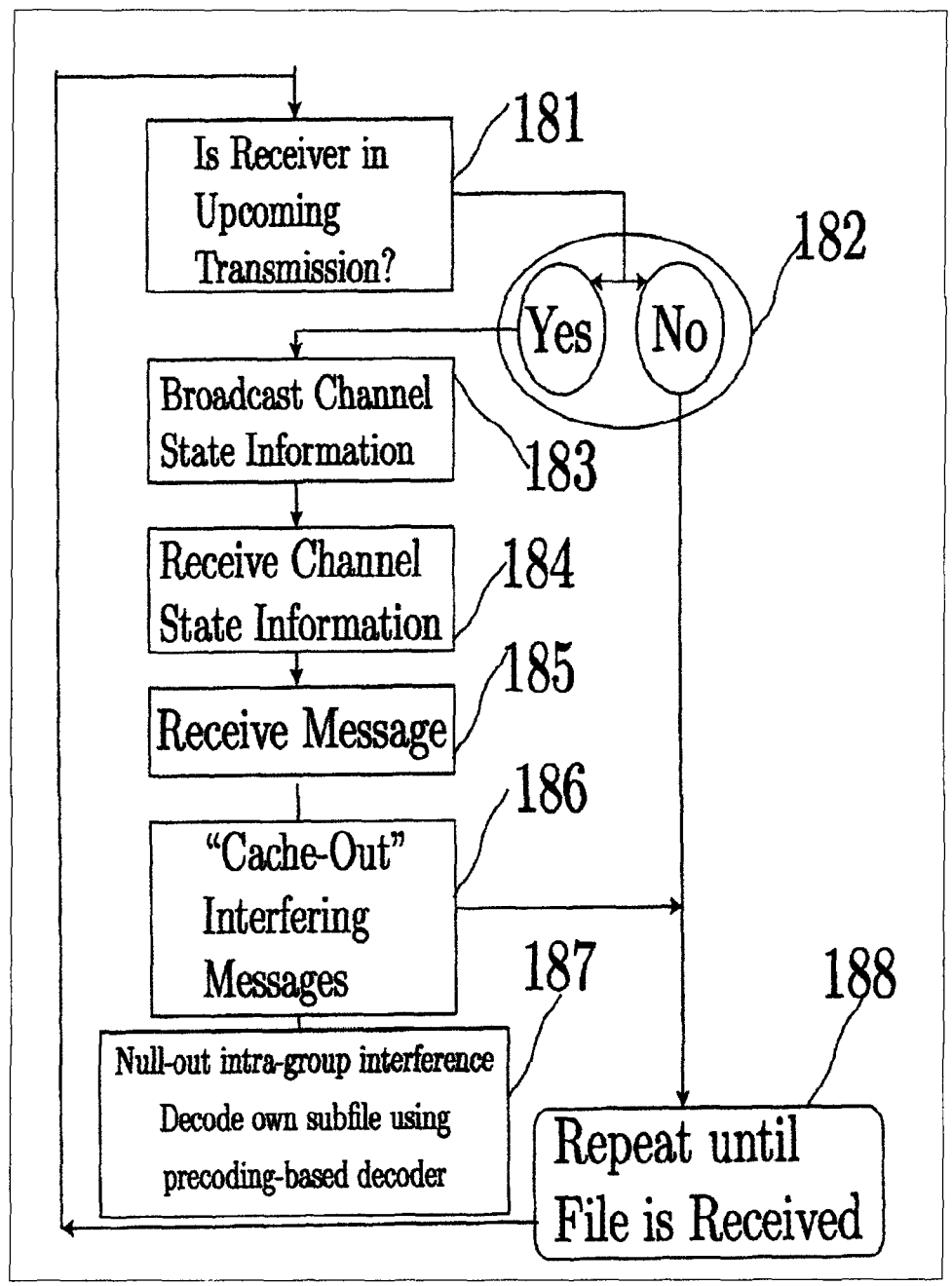
FIG. 18 illustrates one embodiment of the decoding Process at the Receivers

In this embodiment, there are four basic processes embodying two time slots: i) the process of the first time slot to store files in the transmitters' caches (FIG. 15), ii) the process, of the first time slot, that leads to content placement in the caches of the receiving nodes (FIG. 16), iii) the process of the second time slot that leads to transmission of content by the base stations (FIG. 17), and iv) the process of decoding at the receiving nodes (FIG. 18).

Process that leads to content placement in the caches of the transmitting servers: The first process, FIG. 15, starts with a step 151 consisting of server-enumeration where the servers are labeled as $s=1,2,\ldots,K_T$. The second step 1520—designated "Pick server s: $s=1,2,\ldots,K_T$" is the placement algorithm for the transmitter-side caches. For $$\gamma_T = \frac{M_T}{N},$$

the algorithm places, in a step 153, any subfile at exactly $K_T \times \gamma_T$ transmitting base stations. These $K_T \times \gamma_T$ transmitting base stations—for that specific subfile—can play the previous role of the $L = K_T \times \gamma_T$ transmit antennas of the single base station B. The algorithm consecutively caches entire files $F_1$, $F_2$, ..., $F_N$ into the transmitters, such that the first transmitter caches the first $M_T$ files, the second transmitter the next $M_T$ files, and so on, modulo N. Using $Z_{T_{x,s}}$ to denote the cache of transmitting server=$1,2,\ldots,K_T$, then $$Z_{Tx,s} = \{F_{1+(n-1)modN}: n \in \{1+(s-1)M_T, \ldots, M_T s\}\}.$$

This guarantees the memory constraints and the aforementioned requirement that each subfile resides in $K_T \times \gamma_T$ transmitters.

Later, in the transmission of any given subfile, these $K_T \times \gamma_T$ transmitters, with knowledge of the CSIT, can now play the role of the aforementioned $L = K_T \times \gamma_T$ antennas, and thus can precode this said subfile using the exact same precoders described before, allowing for simultaneous separation of the $L = K_T \times \gamma_T$ streams within any given group $G_g$ of $L = K_T \times \gamma_T$ receivers. As before, the aforementioned caching allows for treatment of $$\frac{K}{L}\gamma + 1$$

groups at a time, and a treatment of $K_T \times \gamma_T + K \times \gamma \le K$ users at a time.

The process is terminated in a step 154, when all caches are full ($s = K_T$), and when each file appears in $L = K_T \times \gamma_T$ base stations.

Figure 16:
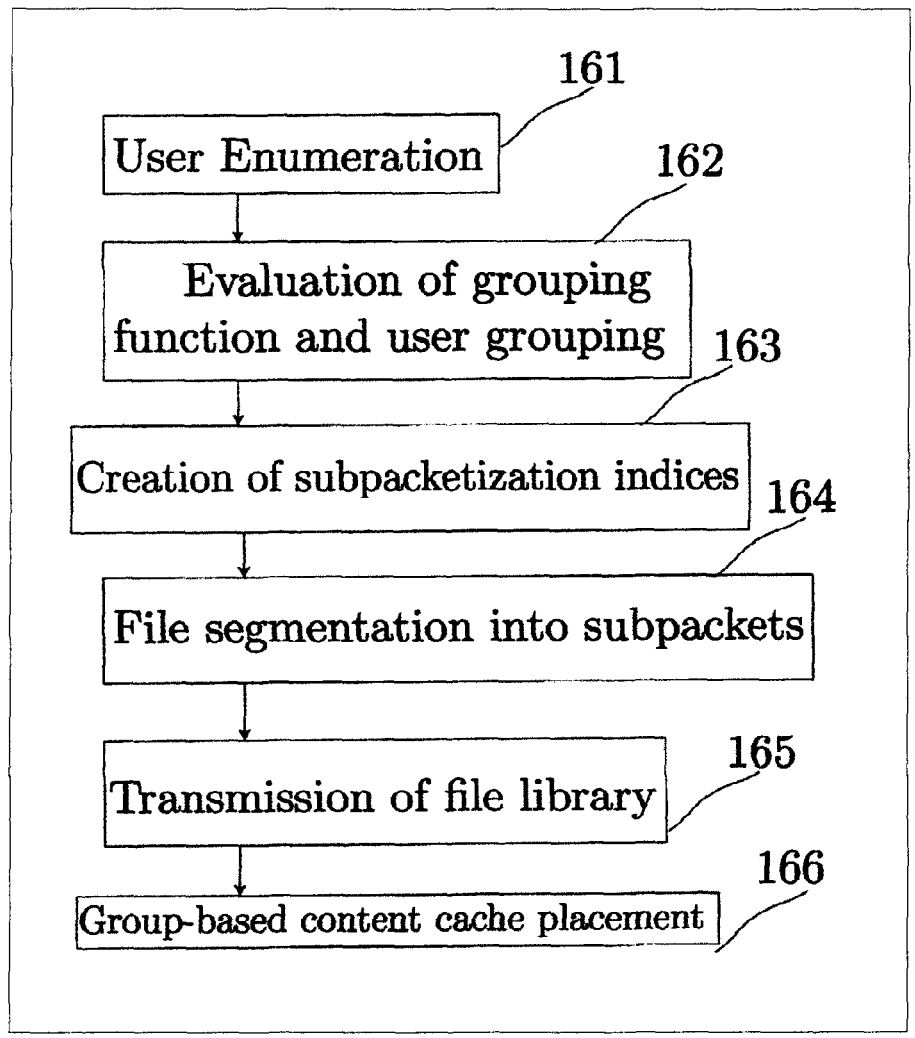
FIG. 16 illustrates the Content Placement at the Receivers in the fourth embodiment.

Process that Leads to Content Placement in the Caches of the Receiving Nodes:

As illustrated in FIG. 16, the second process comprises of the following steps 161-166 in sequence to be performed during the first time-slot.

Steps 161 and 162 are respectively "user enumeration" and "evaluation of grouping function and user grouping". With respect to those steps, users are enumerated and assigned into one of the $$\frac{K}{L}$$

groups. The grouping function will take as input, among other things, the user enumeration, the network topology (link strengths), as well as the cache capabilities of the different receiving nodes. In this specific embodiment here, where the link strengths are the same for each user, and where the cache sizes are also the same across the different receivers, the grouping function is simple and it assigns each group with L users, as follows: users $$\left\{1, \frac{K}{L}+1, \frac{2K}{L}+1, \ldots, \frac{(L-1)K}{L}+1\right\}$$

are placed in group 1, users $$\left\{2, \frac{K}{L}+2, \frac{2K}{L}+2, \ldots, \frac{(L-1)K}{L}+2\right\}$$

are placed in group 2 and so on.

The next step (163) is "Creation of subpacketization indices" which results in the calculation of subpacketization indices τ. To do this, we gather a set T that is some subset of S* sets τ, where each set τ consists of Q distinct numbers from $$\left\{1, 2, \ldots, \frac{K}{L}\right\}.$$

In some specific embodiments, Q can take the value $$Q = \frac{K\gamma}{L}.$$

A next step 164, so-called "File segmentation into subpackets", consists in file segmentation, wherein each file $F_n$, (n=1,2, ..., N) is segmented into S* subfiles $F_{n,\tau}$, where each set τ in T is used to label a different segment of the file.

In the next—so called "Transmission of file library" step 165, the base stations sequentially transmit $x_1$ which maps information from $F_1, F_2, \ldots, F_N$, and each receiving node $N_k$(k=1,2, ..., K) processes their received signal $f_k(x_1)$ to get an estimate of different parts of the library $F_1, F_2, \ldots, F_N$. The transmission is multicast or partial unicast and it can employ one or more transmit antennas.

At the completion of step 25, the first process of FIG. 2 then proceeds to a step 166 designated "Group-based content cache placement" which consists in group-based caching, where each user, depending at least on its group, caches so that the cache overlap—corresponding to the amount of common subfiles—between any two caches, is calculated to be at least a function of whether the two caches belong in the same group or not. In this particular embodiment where the cache sizes are of the same size, and where the link strengths are statistically similar, the caching is as follows: Each user belonging to group i, $$\left(\text{where } i = 1, 2, \ldots, \frac{K}{L}\right),$$

caches every subfile $F_{n,\tau}$ as long as i can be found inside the set τ.

Process that Leads to Transmission of Content by the Base Stations:

With respect to FIG. 17, there will now be described the second process to be performed in the second time slot, consisting of a sequence of steps 171-179, for gathering file requests (step 171), then creating the transmission indices for active groups (step 172), then identifying $K_g$ active groups (step 173), then gathering channel estimates for these $K_g$ active groups (step 174), then creating the precoding vector for an active group (step 175), repeating for each active group (step 176), then combining the precoding vectors of the $K_g$ active groups (step 177), then transmitting the composite vector simultaneously to all $K_g$ active groups (step 178) and repeating the process for a new set of active groups.

More particularly, the process of FIG. 26 starts with a first step 171 being the gathering of file requests, where the receiving nodes request from the transmitters to deliver specific files from the library. In this first preferred embodiment, each receiving node $N_k$ requests one file, by communicating to the base stations the information that describes the label of their requested file $F_{r_k}$ ($r_k \in \{1, 2, \ldots, N\}$, k∈K).

Then, the process proceeds to a step 172 consisting of gathering transmission indices. In this step, indices χ are created that will describe which Q+1 groups will be active, which in turn describes which Q+1 groups to transmit to at any given time. To do this, the process gathers a set X that is some subset of possible sets χ, where each set χ consists of Q+1 distinct numbers from $$\left\{1, 2, \ldots, \frac{K}{L}\right\}.$$

Then, after completion of step 172, the process proceeds to step 173, which is about identifying the active groups. Here, sets χ are sequentially picked from X. Once a set χ is picked, this immediately identifies the Q+1 active groups, which include group i as long as i can be found in the set χ. Thus each χ automatically identifies the L×(Q+1) so called 'active receiving nodes'. In some specific embodiments, Q+1 can take the value $$Q + 1 = \frac{K\gamma}{L} + 1.$$

Given a χ, the step identifies (Q+1)×L active receiving nodes.

Then, in a step 174, the process performs the gathering of channel estimates for the $K_g$ active groups, where each active receiving node $N_k$ communicates their channel state information $h_k$ to the transmitters. As known by a skilled man, this feedback can also take other forms that include receiver state, precoder preference, location information, etc.

In step 175, the process creates a precoding vector for an active group, by precoding L subfiles for L users in the active group. Here, for a given active group i, the transmitters that have cached each of the requested files requested by Group i cooperate to generate the L-length signal vector $$w_{g_i}(\chi) \cdot (H_{G_i})^\perp$$

where $(H_{G_i})^\perp$ is the precoding matrix relative to the channel of group i, and where $$w_{G_i}(\chi) = \left[F_{r_{G_i(1)}, \chi \setminus i}, F_{r_{G_i(2)}, \chi \setminus i}, \ldots, F_{r_{G_i(L)}, \chi \setminus i}\right]$$

is the vector comprised of the vector representation of the subfiles $$F_{\tau_{G_i(1)},\chi\backslash i}, F_{\tau_{G_i(2)},\chi\backslash i}, \ldots, F_{\tau_{G_i(L)},\chi\backslash i}$$

wanted by the L users to group i.

Then, in a step 176 the process repeats the above step (175) for each active group.

In a step 177 the process combines the precoding vectors $w_{G_i}(\chi)\cdot(H_{G_i})^\perp$ of the $K_g$ active groups, to form a composite vector $$x_{t_s} = \sum_{i \in \chi} w_{G_i}(\chi) \cdot (H_{G_i})^\perp,$$

where the summation is over integer numbers i that comprise the currently chosen set $\chi$ of active groups.

In a step 178, the base-stations transmit the composite vector $x_{t_s}$ of length L, simultaneously to all $K_g$ active groups.

At last, in a step 179, the process repeats the steps 172-178 for different sets of $K_g$ active groups.

Process of Decoding at the Receiving Nodes:

With respect to FIG. 18, there will now be described the third process—which is presented here from the point of view of any one user—for decoding at the receiving nodes and which comprises the sequence of steps 181-188 in sequence.

The fourth process starts with step 181, wherein a test is performed to determine whether the user belongs to the upcoming transmission, which in turn means that the receiver is active.

The result of the test is processed in a step 182.

If the user does not belong to the upcoming transmission, then the process proceeds to step 188 wherein the receiver will wait until the next transmission.

If the user belongs to the upcoming transmission, then the process proceeds to a step 183, the receiver will broadcast its channel state information.

Then, in a step 184, the receiver will listen for and record the other channel information from the other active users.

Then, the process proceeds to a step 185, wherein the receiver records the received signal, which is meant for the active groups.

In step 186, the receiver uses channel information and cached content to remove (cache-out) inter-group interference. This is achieved by using a state-of-art cache-aided multicasting method well known to a skilled man, and which is elevated in this step to a group-level such that, by design, the sets T and X, guarantee that all the elements of $$w_{G_i}(\chi) = [F_{\tau_{G_i(1)},\chi\backslash i}, F_{\tau_{G_i(2)},\chi\backslash i}, \ldots, F_{\tau_{G_i(L)},\chi\backslash i}]$$

are cached at the rest participating (active) groups' caches, except the one that desires them (i.e., except at the caches of group i). This means that each receiver of a specific active group holds in its cache all the file segments that have been requested by the users of the other groups that are active at that particular instance.

In a step 187, the receiver applies a standard decoder that reflects the employed state-of-art precoder, to receive its desired subfile. By design of the precoder-and-decoder (which for a specific embodiment can be a simple ZF precoder), a message decoded by a receiver does not contain any file segment intended for another receiver of the same group.

By combining steps (186) and (187), the receiver can remove all other Q unwanted subfiles, and decode its own subfile.

Step (188) consists of repeating the process (181) to (187), until the entire desired file is received.

Example Based on Fourth Embodiment

Assume 4 base stations with 1 transmit antenna each being deployed in a mall. Each transmitter has access to half the library, i.e. $\gamma_T=\frac{1}{2}$ thus L=2. Let there be a library of N=20 files (for example N=20 different movies) and let there be K=20 wireless users (previously referred to as receiving nodes) labeled by 1,2, . . . ,20. Let each receiving node k=1,2, . . . ,20 have a cache (storage) of size corresponding to M=8 (equivalent to the size of 8 files), thus corresponding to a normalized cache size of $$\gamma = \frac{M}{N} = \frac{8}{20} = \frac{2}{5}.$$

5. Phase 1: Transmitter Side Placement (First Time Slot)
   a. Transmitters 1, 3 cache files $\{F_1, F_2, \ldots, F_{10}\}$ and Transmitters 2 and 4 cache files $\{F_{11}, F_{12}, \ldots, F_{20}\}$.
6. Phase 2: Receiver Side Placement (First Time Slot)
   User enumeration and grouping: Users are divided into 5 groups of size L=4. The groups are $G_1=\{1,6,11,16\}$ (group 1), $G_2=\{2, 7, 12, 17\}$ (group 2), $G_3=\{3, 8, 13, 18\}$ (group 3), $G_4=\{4, 9, 14, 19\}$ (group 4), and $G_5=\{5, 10, 15, 20\}$ (group 5).
   Subpacketization indices: We create the set T that includes $$S^* = \binom{\frac{K}{L}}{\frac{K\gamma}{L}} = \binom{5}{2} = 10$$

different sets $\tau$, where each set $\tau$ consists of $$Q = \frac{K\gamma}{L} = 2$$

distinct numbers from $\{1,2, \ldots, 5\}$. Thus T=$\{(1,2), (1,3), (1,4), (1,5), (2,3), (2,4), (2,5), (3,4), (3,5), (4,5)\}$.
   File segmentation: Each file F_n (n=1,2, . . . , N) is segmented into S*=10 subfiles $F_{n,\tau}$ where each set $\tau$ in the above T is used. For example, file $F_1$ is segmented into subfiles $\{F_{1,(1,2)}, F_{1,(1,3)}, F_{1,(1,4)}, \ldots, F_{1,(4,5)}\}$ and similarly with the rest of the files $F_2, \ldots, F_{20}$.
   First phase transmission: The base station (B) sequentially transmits $x_1$ which maps information from $F_1, F_2, \ldots, F_N$.
   Group-based caching: Based on $x_1$, cache-placement commences, so that each user belonging to group i $$\left(i = 1, 2, \ldots, \frac{K}{L}\right)$$

caches every subfile $F_{n,\tau}$ as long as i can be found inside the set T. The cache placement is defined by the following: $Z_1=\{(1,2),(1,3),(1,4),(1,5)\}$ (cache for group 1), $Z_2=\{(1,2),(2,3),(2,4),(2,5)\}$ (cache for group 2), $Z_3=\{(1,3),(2,3),(3,4),(3,5)\}$ (cache for group 3), $Z_4=\{(1,4),(2,4),(3,4),(4,5)\}$ (cache for group 4), and $Z_5=\{(1,5),(2,5),(3,5),(4,5)\}$ (cache for group 5). This means that for example, all users of group 1 (i.e., users 1,6,11,16) will cache all subfiles $F_{n,(1,2)}, F_{n,(1,3)}, F_{n(1,4)}, F_{n,(1,5)}$, for each file $F_n$. Similarly all users of group 2 (i.e., users 2,7,12,17) will cache all subfiles $F_{n,(1,2)}, F_{n,(2,3)}, F_{n,(2,4)}, F_{n,(2,5)}$, again for each file $F_n$, and so on. You can see that inter-group caches have 1 out of 5 parts in common (e.g. groups 1 and 2 have segments labeled by (1,2) in common), while intra-group caches have all elements in common (i.e., caches of the same group are identical).

7. Phase 2: Delivery (Second Time Slot)

File requests: Each user asks for any one file from the library, so user 1 asks for file $F_{r_1}$, user 2 for $F_{r_2}$, and so on, where $r_k \in \{1,2,\ldots,20\}$.

Transmission indices and active group identification: We consider the set $X=\{(1,2,3), (1,2,4), (1,2,5), (1,3,4), (1,3,5), (1,4,5), (2,3,4), (2,3,5), (2,4,5), (3,4,5)\}$ consisting of sets $\chi$, where each set $\chi$ consists of $Q+1=3$ distinct numbers from the set $\{1,2,3,4,5\}$. Each different $\chi$ describes a different set of $Q+1=3$ active groups, corresponding to $(Q+1) \times L=12$ active users. For example, when=(1,2,3), it means that the active groups are groups 1,2 and 3, which are the groups that the base stations will transmit to, during this time.

Feedback to transmitters and Transmission to groups: The first transmission is denoted by $x_{123}$ where the index implies that all users belonging in groups 1,2 and 3 are going to be receiving a desired subfile. Each active receiving node $N_k$ (i.e., any user from groups 1,2 or 3) communicates channel state information $h_k$ back to the transmitter. The transmitted vector, from the base stations to the active receivers, then takes the form $$x_{123} = (H_{G_1})^{-1} \cdot \begin{pmatrix} F_{r_1,(2,3)} \\ F_{r_6,(2,3)} \\ F_{r_{11},(2,3)} \\ F_{r_{16},(2,3)} \end{pmatrix} + (H_{G_2})^{-1} \cdot \begin{pmatrix} F_{r_2,(1,3)} \\ F_{r_7,(1,3)} \\ F_{r_{12},(1,3)} \\ F_{r_{17},(1,3)} \end{pmatrix} + (H_{G_3})^{-1} \cdot \begin{pmatrix} F_{r_3,(1,2)} \\ F_{r_8,(1,2)} \\ F_{r_{13},(1,2)} \\ F_{r_{18},(1,2)} \end{pmatrix}.$$

Then, the received messages—focusing on the case of group 1 ($G_1=\{1,6,11,16\}$)—stacked as a vector to incorporate the received signals at users $\{1,6,11,16\}$, takes the form:

$$y_{123}(G_1) = \begin{pmatrix} F_{r_1,(2,3)} \\ F_{r_6,(2,3)} \\ F_{r_{11},(2,3)} \\ F_{r_{16},(2,3)} \end{pmatrix} + H_{G_1} \cdot (H_{G_2})^{-1} \cdot \begin{pmatrix} F_{r_2,(1,3)} \\ F_{r_7,(1,3)} \\ F_{r_{12},(1,3)} \\ F_{r_{17},(1,3)} \end{pmatrix} + H_{G_1} \cdot (H_{G_3})^{-1} \cdot \begin{pmatrix} F_{r_3,(1,2)} \\ F_{r_8,(1,2)} \\ F_{r_{13},(1,2)} \\ F_{r_{18},(1,2)} \end{pmatrix}$$

As seen from the above equation, each user in Group 1 receives the desired subfile plus a linear combination of all the subfiles intended for the users in the other participating groups (groups 2 and 3 in this case), where this linear combination depends on the channels of these $K\gamma+L$ par-ticipating (active) users. By using the cached content and the knowledge of the channel coefficients, each user can decode their desired subfile.

In the same manner, we proceed with the rest of the transmissions, i.e., with the rest of the $\chi$, i.e., with $\chi=(1,2,4)$ corresponding to active groups 1,2 and 4, then with $\chi=(1,2,5)$ corresponding to active groups 1,2 and 5, and so on.

From the above algorithm we can see that there are $K\gamma+L=12$ users served at a time, while the number of file segments (subpacketization) is $$S^* = \binom{\frac{K}{L}}{\frac{K\gamma}{L}} = \binom{5}{2} = 10.$$

Without our method, the best known subpacketization needed to achieve this same performance would have been $$S^* = \binom{K}{K\gamma} \times \binom{K_T}{L} = \binom{20}{8} \times \binom{4}{2} = 125970 \times 6 = 755820.$$

The complexity reduces from approximately 7 million (distinct transmissions), to just 10 distinct transmissions.

Another interpretation of the above is that for any state-of-art placement-delivery, which is constrained by the file size, the here proposed method can achieve a boost of L times on (cache-aided multicasting gains). Specifically, if a cache-aided multicasting algorithm can achieve multicasting gain of $\overline{G}_C$ for some maximum allowable number F of segments per file (maximum subpacketization level of F) then the here proposed algorithm can achieve a multicasting gain of $\min\{L \times \overline{G}_C, K\gamma+1\}$ under the same segmentation (complexity) constraint F.

What is claimed is:

1. A process of communication between a transmitting base station ("BS"), with L>1 transmit antennas, and a set of Kuser terminals $N_1, N_2, \ldots, N_K$ (UT) in a wireless communication system, wherein UTs have storage capabilities, caches, and where said UTs will ask for a file from a library of files and wherein said process involves:

i) The steps at the BS during a first time-slot where:
      the BS assigns each UT to one group from a plurality of groups;
      the BS identifies a set of files of interest $F_1, F_2, \ldots, F_N$ that may be requested by the UTs;
      the BS segments files into subfiles and each subfile is labeled, wherein the aforementioned labelling can take various forms including indicating the groups that each subfile will be cached by;
      the BS transmits subfiles from some or all files of the library and each UT caches or not caches each subfile according to the group the UT belongs to;
   ii) The steps at the BS during a second time-slot where:
      the BS receives a request from two or more UTs (requesting UTs) for one or more files from the files;
      the BS picks $$\frac{G}{L}+1$$

groups and activates up to L requesting UTs per group;

the BS receives channel state information (CSI) from all active UTs, which CSI could take various forms including training symbols and precoder selection;

the BS communicates to the UTs CSI knowledge about the channels of other UTs, which CSI could take various forms including training symbols and precoder selection;

the BS uses the CSI to create precoder matrix $H_{G_i}^{-1}$ corresponding to each picked group $G_i$, that is designed to reduce or nullify interference between active UTs of group $G_i$, wherein said precoder matrix can be created using a method including Zero-Forcing, MMSE precoding and precoder selection;

for each picked group $G_i$, the BS selects subfiles from the files requested by the group's active UTs, such that each subfile is cached at all other picked groups apart from the UT's group and the BS arranges those subfiles in a vector;

the BS multiplies each group's vector with the group's matrix precoder $H_{G_i}^{-1}$ forming the group i precoder-vector product;

the BS combines all group precoder-vector products in a single vector using some operation including addition and linear combination forming the message;

the BS transmits the message;

iii) The steps at the UT during a first time-slot where:
The UT is assigned to a group;
The UT stores subfiles of the files to its cache according to the group the UT belongs to;

iv) The steps at the UT during a second time-slot where:
The UT communicates to the BS the UT's file preference;
The UT is informed of the other UTs that request files from the same BS and the file preferences of the other UTs;
The UT communicates to the BS the UT's CSI, which CSI can take various forms including training symbols or precoder selection;
The UT receives from the BS CSI knowledge concerning, at least, the other active UTs;
The UT receives a message and proceeds to decode said message by employing the UT's cached subfiles and the received CSI.

2. The process according to claim 1 wherein some of the UTs may not have storage capabilities.

3. The process according to claim 2 wherein said transmission from the base station considers available receiver-state information, receiver location information and/or network connectivity information.

4. A process of communication between a set of L>1 wired servers (WSs) and a set of rewired user terminals $N_K$ (WUTs), wherein WUTs, have storage capabilities (caches), where said WUTs will ask for a file from a library of known files and where there are intermediary nodes performing arithmetic operations on received messages and forwarding them and wherein said process involves:

i) The steps at one or more WSs during a first time-slot where:
One or more WSs assign each WUT to one group from a plurality of groups;
One or more WSs identify a set of files of interest $F_1$, $F_2$, ..., $F_N$ that may be requested by the WUTs;
One or more WSs label said files, wherein, for instance, said labelling indicates the groups that each subfile will be cached by;

The WSs transmit subfiles from some or all files of the library and each WUT stores (caches) or not caches each subfile according to the group the WUT belongs to;

ii) The steps at one or more WSs during a second time-slot where:
One or more WSs receive requests of one or more files from the WUTs;
One or more WSs pick $$\frac{G}{L} + 1$$

groups and activate up to L requesting WUTs per group;

One or more WSs receives network coding state information (NCSI) from WUTs and/or intermediary nodes, which NCSI describes the arithmetic operations taking place at the intermediary nodes and which NCSI could take various forms including training symbols and precoder selection;

One or more WSs transmit NCSI messages to WUTs which NCSI corresponds to processes happening between the WSs and active WUTs and which communication can take various forms including transmission of training symbols and precoder association;

One or more WSs using the aforementioned NCSI create the precoder matrix $H_{G_i}^{-1}$ corresponding to each picked group $G_i$, which precoder matrix $H_{G_i}^-$ is designed such that to reduce or nullify interference between active WUTs of that group; wherein the aforementioned precoder matrix $H_{G_i}^{-1}$ can be created using various ways including by performing an inversion of the NCSI matrix between WSs and WUTs;

One or more WSs select subfiles for each picked group $G_i$ such that each subfile is cached at all other picked groups apart from the WUT's group and the WSs arrange those subfiles in a vector;

One or more WSs multiply each active group's vector with the group's matrix precoder $H_{G_i}^{-1}$ forming group precoder-vector product;

One or more WSs combine all group precoder-vector products using some operation including addition and linear combination forming the message;

One or more WSs transmits one element from the message;

iii) The steps at an intermediary node of:
Receiving a set of messages from different WSs;
Combining received messages using pre-defined operations including additions and multiplications;
Transmitting combined messages;

iv) The steps at the WUT during a first time-slot where:
The WUT is assigned to a group;
The WUT stores segments of files to its cache according to the group the WUT belongs to;

v) The steps at the WUT during a second time-slot where:
The WUT communicates to the WSs the WUT's file preference;
The WUT is informed of the other WUTs that will be part of the transmission;
The WUT is informed of the other WUTs' file preferences;

The WUT communicates to the WS the WUT's NCSI, which NCSI can take various forms including training symbols precoder selection;

The WUT receives from the WSsNCSI concerning the other WUTs;

The WUT receives a message and proceeds to decode said message by employing the WUT's cached content and NCSI.

5. The process according to claim 4 wherein some of the WUTs may not have storage capabilities.

6. The process according to claim 4 wherein said transmission from the WS considers available receiver-state information, receiver location information and/or network connectivity information.

7. The process according to claim 4 wherein the WS or one or more intermediary nodes are connected directly to at least two wired user terminals.

8. A process of communication between a set of K wireless user terminals $N_1, N_2, \ldots, N_K$, wherein said wireless user terminals $N_1, N_2, \ldots, N_K$ have storage capabilities (caches), where said wireless user terminals will ask for a file from a library of known files and wherein said process involves the steps of:

i) The steps at one or more wireless user terminals during a first time-slot where:

Each wireless user terminal is assigned to one group from a plurality of groups;

One or more wireless user terminals identify a set of files of interest $F_1, F_2, \ldots, F_N$, that may be requested by the wireless user terminals;

One or more wireless user terminals segments files into subfiles and which subfiles are labeled, wherein the aforementioned labelling can take various forms including indicating the groups that each subfile will be cached by;

Wireless user terminal caches or not caches each subfile according to the group the wireless user terminal belongs to;

i) The steps at one or more wireless user terminals during a second time-slot where:

One or more wireless user terminals request one or more files from the files;

L>1 wireless user terminals use coordination or some pre-defined selection criterion to pick a set of $$\frac{G}{L}+1$$

groups and the wireless user terminals activate up to L>1 requesting wireless user terminals per group;

One group comprised of up to LD2DUTs is assigned to act as the transmitting groups; wherein the transmitting groups' active D2DUTs are the transmitting D2DUTs; wherein the rest $$\frac{G}{L}$$

groups compose the receiving groups and the active users of the receiving groups compose the receiving D2DUTs;

One or more wireless user terminals exchange Channel state information (CSI), which CSI could take various forms including training symbols and precoder selection;

One or more wireless user terminals exchange use the aforementioned CSI to create the precoder matrix $H_{G_i}^{-1}$ for each receiving group $G_i$, such that the precoder matrix reduces or nullifies interference between receiving wireless user terminals of that group; wherein the aforementioned precoder matrix can be created using any from a plurality of methods, including Zero-Forcing, MMSE precoding and precoder selection;

One or more wireless user terminals select subfiles from the files selected by the receiving wireless user terminals and transmit said subfiles to each receiving group $G_i$, such that each subfile is cached by the transmitting group and all receiving groups apart from group $G_i$, and the transmitting group places those subfiles in a vector;

One or more wireless user terminals multiply each receiving group's vector with the group's matrix precoder $H_{G_i}^{-1}$ forming receiving group i precoder-vector product;

One or more wireless user terminals combine all group precoder-vector products using some operation including addition and linear combination (vector message);

One or more wireless user terminals transmit one element from the vector message;

ii) The steps at one or more wireless user terminals during a first time-slot where:

The wireless user terminal communicates to other wireless user terminals the wireless user terminal's file preference;

The wireless user terminal is informed of the other participating wireless user terminals;

The wireless user terminal is informed of the other participating wireless user terminals' file preference;

The wireless user terminal communicates to the requesting wireless user terminals the wireless user terminal's CSI, which CSI can take various forms including training symbols and precoder selection;

The wireless user terminal receives from other wireless user terminals CSI;

The wireless user terminal receives a message and proceeds to decode said message by employing the wireless user terminal's cache and the aforementioned CSI.

9. The process of claim 8 where some of the wireless user terminals are not equipped with caches.

10. The process according to claim 8 wherein said transmission from the wireless user terminals considers available receiver-state information, receiver location information and/or network connectivity information.

11. The process of claim 8 wherein at least one wireless terminal has more than one transmitting or receiving antennas.

12. A process of communication between a set of L>1 wireless distributed base stations (DBS) and a set of K wireless user terminals $N_1, N_2, \ldots, N_K$(UTs), wherein UTs $N_1, N_2, \ldots, N_K$ have storage capabilities (caches), where said UTs will ask for a file from a library of known files and wherein said process involves the steps at the DBSs of:

i) The steps at one or more DBS during a first time-slot where:

One or more DBS assigns each UT to one group from a plurality of groups;

One or more DBS identifies a set of files of interest $F_1, F_2, \ldots, F_N$ that may be requested by the UTs;

One or more DBS segments said files into subfiles and labels said subfiles, wherein the aforementioned labelling can take various forms including indicating the groups that each subfile will be cached by;

One or more DBS transmit subfiles from some or all files;

ii) The steps at one or more DBS during a second time-slot where:

The DBS receive file requests by two or more UTs;

The DBS pick $$\frac{G}{L}+1$$

groups and activate up to L requesting UTs per group;

The DBS receive channel state information (CSI) from active UTs, which CSI could take various forms including training symbols and precoder selection;

The DBS communicate the aforementioned CSI knowledge about the channels of other UTs, which CSI could take various forms, including training symbols and precoder selection;

The DBS using the aforementioned CSI to create the precoder matrix $H_{G_i}^{-1}$ for each picked group $G_i$, which precoder matrix $H_{G_i}^{-1}$ is designed such that to reduce or nullify interference between UTs of that group; wherein the aforementioned precoder matrix can be created using various ways including precoder selection, Zero-Forcing and MMSE precoding;

The DBS select subfiles from the files requested by the active UTs of each picked group $G_i$, such that each subfile is cached at all picked groups apart from group $G_i$ and the DBS place those subfiles in a vector;

The DBS multiply each active group's vector with the group's precoder matrix $H_{G_i}^{-1}$ forming group precoder-vector product;

The DBS combine all group precoder-vector products in the form of some operation such as including addition and linear combination;

Each DBS transmits one element from the message;

And the steps at the UT of:

i) The UT during Aa first time-slot caches subfiles of files to its cache, ii) The UT during a second time-slot:
communicates to the DBS the UT's file preference;
is informed of the other UTs that will be part of the transmission;
is informed of requesting UTs' file preferences;
communicates to the DBS the UT's CSI, which CSI can take various forms including training symbols and precoder selection;
receives from the DBS CSI concerning the other UTs;
receives a message and proceeds to decode said message by employing the UT's cache and received CSI.

13. The process according to claim 12 wherein some of the user terminals may not have storage capabilities.

14. The process according to claim 12 wherein said transmission from the distributed base stations considers available receiver-state information, receiver location information and/or network connectivity information.

15. The process according to claim 12 wherein the distributed base stations are equipped with one or more transmit antennas and wherein active users per group can be chosen to be at most equal to the total number of transmitting antennas that are found at the distributed base stations.

* * * * *